(12) United States Patent
Pedersen et al.

(10) Patent No.: US 7,269,950 B2
(45) Date of Patent: Sep. 18, 2007

(54) STAGED TURBOCHARGER

(75) Inventors: Melvin H. Pedersen, North Salt Lake, UT (US); Steven R. Benson, Las Vegas, NV (US)

(73) Assignee: Precision Industries, Inc., North Salt Lake, UT (US)

( * ) Notice: Subject to any disclaimer, the term of this patent is extended or adjusted under 35 U.S.C. 154(b) by 0 days.

(21) Appl. No.: 10/839,771

(22) Filed: May 5, 2004

(65) Prior Publication Data

US 2005/0247058 A1 Nov. 10, 2005

(51) Int. Cl.
*F02B 39/00* (2006.01)
*F02B 37/12* (2006.01)

(52) U.S. Cl. .................. 60/602; 417/406; 417/407

(58) Field of Classification Search .......... 60/602; 417/406; 415/203, 205; 123/559.1; *F02B 39/00, F02B 37/12*
See application file for complete search history.

(56) References Cited

U.S. PATENT DOCUMENTS

| | | | | |
|---|---|---|---|---|
| 3,557,549 A | * | 1/1971 | Webster | 60/602 |
| 3,559,397 A | | 2/1971 | Navarro | 60/602 |
| 3,664,761 A | * | 5/1972 | Zastrow | 415/205 |
| 4,005,578 A | | 2/1977 | McInerney | 60/602 |
| 4,027,994 A | | 6/1977 | MacInnes | 415/203 |
| 4,339,922 A | | 7/1982 | Navarro | 60/602 |
| 4,389,845 A | * | 6/1983 | Koike | 60/602 |
| 4,391,098 A | | 7/1983 | Kosuge | 60/602 |
| 4,544,326 A | * | 10/1985 | Nishiguchi et al. | 415/151 |
| 4,611,465 A | * | 9/1986 | Kato et al. | 60/602 |
| 4,745,753 A | * | 5/1988 | Tadokoro et al. | 60/602 |
| 4,809,509 A | * | 3/1989 | Hohkita | 60/605.1 |
| 4,875,837 A | * | 10/1989 | Usami et al. | 417/407 |
| 5,046,317 A | * | 9/1991 | Satokawa | 60/602 |
| 5,560,208 A | * | 10/1996 | Halimi et al. | 60/602 |
| 5,673,559 A | * | 10/1997 | Benson | 60/602 |
| 6,073,447 A | * | 6/2000 | Kawakami et al. | 60/602 |
| 6,694,734 B2 | | 2/2004 | Akao et al. | 60/605.1 |
| 6,708,674 B2 | | 3/2004 | Benson | |
| 6,709,235 B2 | * | 3/2004 | Hosny | 415/205 |
| 2004/0244373 A1 | * | 12/2004 | Frankenstein et al. | 60/602 |
| 2005/0086936 A1 | * | 4/2005 | Bucknell et al. | 60/602 |

FOREIGN PATENT DOCUMENTS

| | | | | |
|---|---|---|---|---|
| JP | 56113015 A | * | 9/1981 | |
| JP | 58138222 A | * | 8/1983 | |

(Continued)

OTHER PUBLICATIONS

Nice, Karim, *How Turbochargers Work*, http://auto.howstuffworks.com/turbo.htm/printable, Apr. 1, 2004, pp. 1-6.

*Primary Examiner*—Thai-Ba Trieu
(74) *Attorney, Agent, or Firm*—Pate Pierce & Baird

(57) ABSTRACT

A turbocharger comprising a turbine, director, and compressor. The turbine may be formed as a turbine wheel surrounded by at least two scrolls. The at least two scrolls may direct exhaust gases supplied thereto toward the turbine wheel to cause rotation thereof. The director may control distribution of the exhaust gases between the at least two scrolls to optimize circumferential velocity in the scroll or volute, and thus impingement velocity on the turbine. The compressor may be driven by the turbine.

28 Claims, 19 Drawing Sheets

FOREIGN PATENT DOCUMENTS

| | | | | |
|---|---|---|---|---|
| JP | 61160526 A | * | 7/1986 |
| JP | 63021329 A | * | 1/1988 |
| JP | 63111236 A | * | 5/1988 |
| JP | 63215829 A | * | 9/1988 |
| JP | 63230923 A | * | 9/1988 |
| JP | 01187320 A | * | 7/1989 |
| WO | WO 2004031556 A1 | * | 4/2004 |

* cited by examiner

SECTION C-C

SECTION A-A

SECTION B-B

STAGED TURBOCHARGER

BACKGROUND

1. The Field of the Invention

This invention relates to internal combustion engines and, more particularly, to novel systems and methods for forced induction systems.

2. The Background Art

It is often desirable to increase the power output of an internal combustion engine. This may be done in several ways. For example, power output can be increased by increasing the displacement of the engine. Generally, however, the larger the displacement, the larger and heavier the engine. Thus, in selected situations, increasing displacement is not an attractive option to obtain a desired increase in power. Accordingly, those of skill in the art have sought ways of increasing power output without increasing displacement.

One method of providing an increase in power output without increasing displacement is to apply a forced induction system to the engine. A forced induction system increases the pressure of intake gases entering the cylinders of the engine. Under greater pressure, more gas molecules (including oxygen molecules) are forced into the cylinders. With the increase in oxygen, greater amounts of fuel may be inserted within the cylinder and combusted to completion. Accordingly, power output may be increased.

Presently, forced inductions systems usually come in one of two forms, superchargers and turbochargers. Superchargers are compressors driven by the crankshaft of the engine. As would be expected, the work done by the compressor is a direct parasitic load on the engine. However, superchargers may still provide a net increase in power so long as the power gain outweighs the parasitic load.

Turbochargers, on the other hand, are not driven directly by the crankshaft of the engine. Instead, a turbocharger uses a turbine to extract energy from the exhaust gases flowing through the exhaust system. This energy is then applied to a compressor that compresses the intake gases. While a turbocharger may require an engine to work harder in expelling exhaust gases, the load on the engine is usually less than that caused by a supercharger. However, unlike superchargers, turbochargers are not instantly responsive to changes in engine speed. Accordingly, turbochargers suffer from what is known as turbo-lag, a delay between the increase in engine speed and the increase in power output.

Typically, the turbine of a turbocharger is surrounded by a scroll (volute). A volute is typically of substantially constantly decreasing cross-sectional area along its length (actually more like a circumference) to maintain substantially a constant gas velocity therein. The scroll acts as a chamber, conduit, and nozzle to direct the flow of exhaust gases toward the surrounded blades of the turbine to induce rotation. Different scrolls are designed for different volumetric flow rates of exhaust gases. The volumetric flow rate of exhaust gases, however, is a function of engine speed. Thus, typical turbocharger turbines operate tn optimal levels only within a specific range of engine speeds. On either side of that specific range, performance of the turbocharger degrades. What is needed is a turbocharger with an adjustable effective scroll volume to properly handle a wider range of volumetric flow rates of exhaust gases.

BRIEF SUMMARY OF THE INVENTION

Certain embodiments in accordance with the present invention may provide a turbocharger comprising a turbine, compressor, and director. The turbine may include a turbine wheel surrounded by at least two scrolls. The scrolls may be symmetrically or asymmetrically arranged to direct exhaust gases supplied thereto toward the turbine wheel to cause rotation. Rotation of the turbine wheel may, in turn, cause the rotation of the compressor.

The director may be positioned upstream from the turbine to control distribution of the exhaust gases between the scrolls. By varying which scroll (or combination of scrolls) receives exhaust gases, a director may control the flow velocity in a principle volute, and thus impingement velocity, of the exhaust gases on the turbine wheel. This control may be used to maintain the impingement velocity at or near levels corresponding to optimal turbine performance.

For low volumetric flows of exhaust gases, the director may increase the impingement velocity to near an optimal level by directing the flow of exhaust gases to a comparatively smaller scroll. For higher volumetric flows of exhaust gases, the director may decrease the impingement velocity to near the optimal level by directing the flow of exhaust gases into a larger scroll or a combination of smaller scrolls. For very high volumetric flows of exhaust gases, the director may permit excess exhaust gases to bypass the turbine, thereby maintaining the impingement velocity near the optimal level and limiting the back pressure generated against the engine exhausting the gases.

In selected embodiments, a director may comprise a gate operating under the direction of a controller. The controller may pivot, translate, or otherwise move the gate in and out of an exhaust conduit to exert control over the gases flowing therethrough. The director may be arranged so that only redirections of less than ninety degrees are imposed on the flow of exhaust gases. Accordingly, the energy contained in the flow of exhaust gases may be imparted to the turbine wheel, rather than the director. A controller may use hydraulic, pneumatic, mechanical, or electrical forces to adjust the position of the gate in accordance with the volumetric flow of exhaust gases.

BRIEF DESCRIPTION OF THE DRAWINGS

The features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 28, is not intended to limit the scope of the invention, as claimed, but is merely representative of selected embodiments of the invention. The exemplary embodiments of the invention will be best understood by reference to the drawings, wherein like parts are designated by like numerals throughout.

Figure 1:
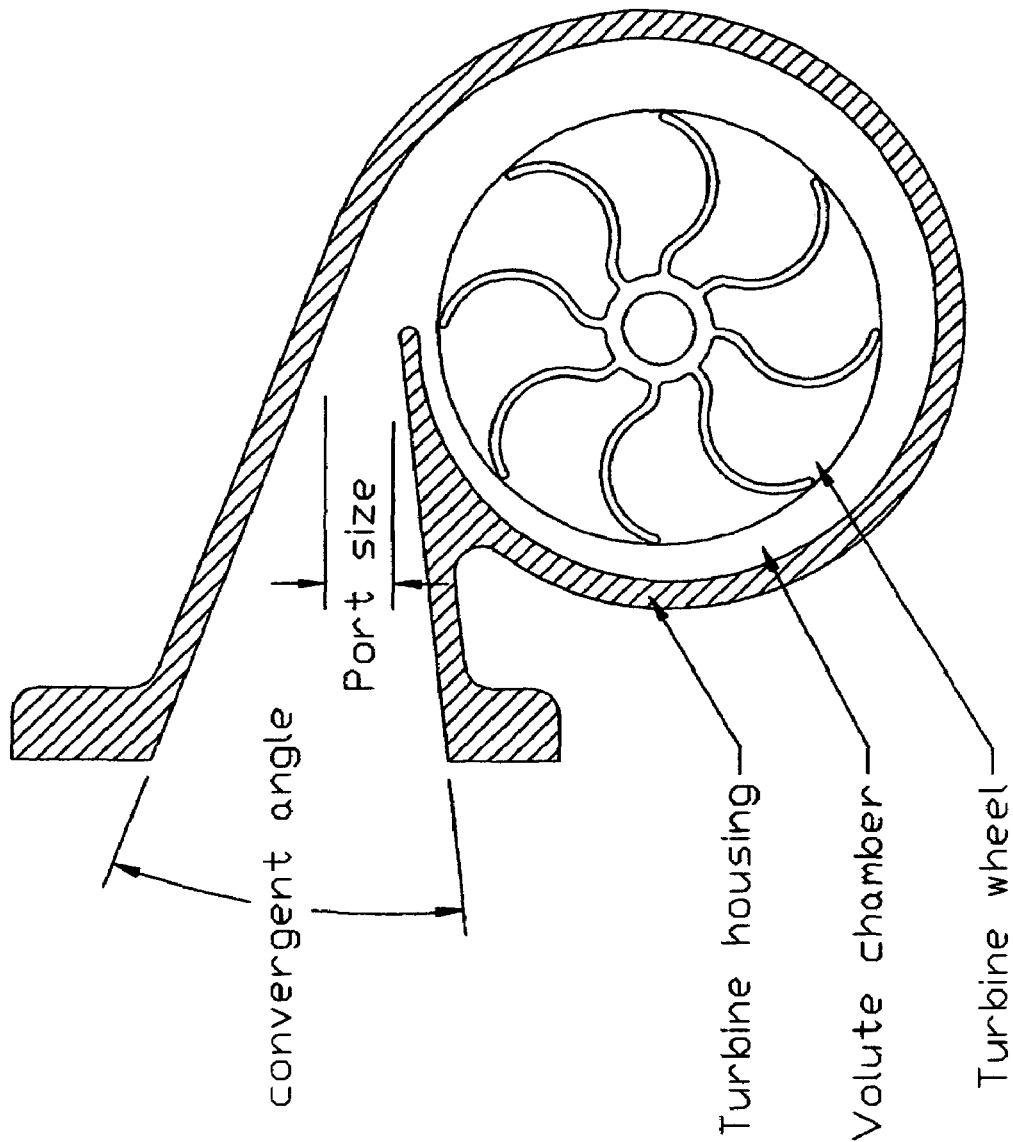
FIG. 1 is a schematic, block diagram of an internal combustion engine with a forced induction system in accordance with the present invention.

Referring to FIG. 1, a forced induction system 10 in accordance with the present invention may be applied to an exhaust stream, such as one from an internal combustion engine 12 having any number of cylinders 14. During operation, each cylinder 14 may receive intake gases and expel exhaust gases. Exhaust gases exiting a cylinder 14 may enter an exhaust system 16. In general, an exhaust system 16 may included whatever piping 18 is needed (e.g. conduits 18) to conduct the exhaust gas from a cylinder 14 to a suitable location for release into the atmosphere. In certain embodiments, an exhaust manifold 20 may be included as part of the exhaust system 16. An exhaust manifold 20 may collect exhaust gases from one or more cylinders 14 to form a single flow. The manifold 20 may be divided according to which valves of a multi valve exhaust system service a piston in an engine.

If desired, more than one exhaust manifold 20 may be incorporated within an exhaust system 16. For example, half the cylinders 14 may be connected to one exhaust manifold 20, while the other half of the cylinders 14 may be connect to another exhaust manifold 20. Multiple exhaust manifolds 20 may limit the amount of exhaust gases from one cylinder 14 entering a neighboring cylinder 14 operating in a different location within is cycle. Accordingly, cylinders 14 operating within a particular range of their respective cycles may expel exhaust gases to one exhaust manifold while cylinders 14 operating within another range of their respective cycles may expel exhaust gases to another exhaust manifold 20.

In selected embodiments, flows of exhaust gases may be merged before encountering a director 22. A director 22 may be any device that blocks, deflects, divides, proportions, or otherwise controls the flow of exhaust gases into a turbocharger 24. A director 22 may be positioned in any suitable location between the cylinder 14 and the turbocharger 24. A director 22 may be formed of any suitable materials. A suitable material may be selected to provide desired strength, rigidity, formability, wear resistance, heat resistance, cost, and the like. Suitable materials may include metals, metal alloys, composites, ceramics, and the like. In one embodiment, a director 22 is formed of cast iron.

A director 22 may proportion the flow of exhaust gases among one or more scrolls 26 of a turbine 28 of a turbocharger 24. For example, at relatively low volumetric flows of exhaust gases, a director 22 may direct all or a larger portion of the exhaust gases into a first scroll 26a. At higher volumetric flows of exhaust gases, a director 22 may direct (or simply permit) the exhaust gases to flow into both the first scroll 26a and a second scroll 26b. At relatively high volumetric flows of exhaust gases, a director 22 may direct (or simply permit) the exhaust gases to flow into the first and second scrolls 26a, 26b and a bypass 30 or waste-gate 30 circumventing the turbine 28. A bypass 30 may preserve engine performance by providing a control to reduce back pressure within the exhaust system 16.

Once the exhaust gases have passed through the turbine 28, they may be conducted by the exhaust system 16 to an exhaust port 32, where they may be released to the atmosphere. The energy extracted from the exhaust gases by the turbine 28 may be transmitted to a compressor 34. In one embodiment, the energy is transmitted via a drive shaft 36 with which the turbine 28 and compressor 34 both rotate.

A compressor 34 may be positioned within an intake system 38. In general, an intake system 38 may included whatever piping 40 is needed to direct the intake gases from an intake port 42 to a cylinder 14. The compressor 34 may compress the intake gases to a pressure above that found in the ambient atmosphere. This increase in pressure, or "boost," may typically range anywhere from one to several pounds per square inch (psi). In one embodiment, the compressor 34 provides a boost of about 6 to 8 psi.

Because gas pressure, volume, and temperature are interrelated, the boost provided by the compressor 34 may increase the temperature of the intake gases. This increase in temperature, in turn, increases the volume of the intake gases. Accordingly, in selected embodiments, it may be desirable to pass the compressed intake gases through an intercooler 44. In selected embodiments, an intercooler 44 may be a radiator positioned in a location where heat within the intake gases may be transferred to ambient air. By lowering the temperature of the intake gases, for a given pressure, a greater number of air molecules may fit with in a cylinder 14. If desired, one or more intake manifolds 46 may be used to facilitate distribution of the intake gases to the various cylinders 14.

Figure 2:
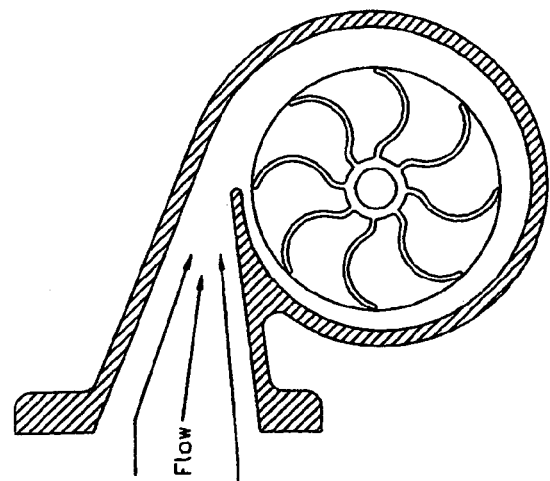
FIG. 2 is a schematic, block diagram of a director in accordance with the present invention applied to a single-manifold, exhaust system.

Referring to FIG. 2, a forced induction system 10 in accordance with the present invention may be applied to an internal combustion engine 12 having one exhaust manifold 20 or one pipe 18 conducting exhaust gases. In such embodiments, a director 22 may (1) direct all or substantially all of the exhaust gases to a path 48 leading to a first scroll 26a, (2) direct all or substantially all of the exhaust gases to a path 50 leading to a second scroll 26b, (3) proportion the exhaust gases between the first and second scrolls 26a, 26b, (4) permit a portion of exhaust gases to enter a bypass 30, or (5) apply some combination of the foregoing.

A division of exhaust gases between multiple scrolls 26 may be accomplished actively or passively. For example, a director 22 may direct a majority of the exhaust gases toward one scroll 26. Alternatively, a director 22 may be positioned within the flow of exhaust gases to permit principles of gas dynamics to regulate what proportion of the exhaust gases a particular scroll 26 receives.

Figure 3:
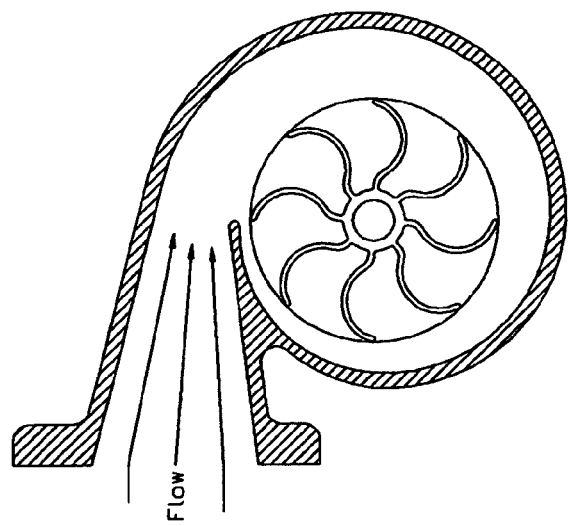
FIG. 3 is a schematic, block diagram of a director in accordance with the present invention applied to a multi-manifold, exhaust system.

Referring to FIG. 3, a forced induction system 10 in accordance with the present invention may be applied to an internal combustion engine 12 having more than one exhaust manifold 20 or more than one pipe 18 conducting exhaust gases. In such embodiments, a director 22 may (1) direct all or substantially all of the exhaust gases from all manifolds 20 (pipes 18) to a path 48 leading to a first scroll 26a, (2) direct all or substantially all of the exhaust gases from all manifolds 20 (pipes 18) to a path 50 leading to a second scroll 26b, (3) proportion the exhaust gases from all manifolds 20 (pipes 18) between the first and second scrolls 26a, 26b, (4) send exhaust gases traveling from a first exhaust manifold 20a (pipe 18a) to a first scroll 26a and exhaust gases traveling from a second exhaust manifold 20b (pipe 18b) to a second scroll 26b, (5) permit a portion of exhaust gases to enter a bypass 30, or (5) apply some combination of the foregoing.

Figure 4:
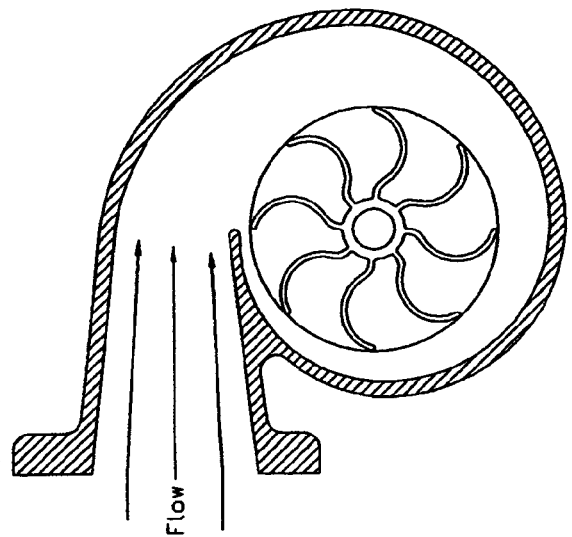
FIG. 4 is a schematic, block diagram of multiple directors in accordance with the present invention applied to a multi-turbocharger, forced induction system.

Referring to FIG. 4, in certain embodiments, it may be desirable to apply more than one turbocharger 24 to an internal combustion engine 12. For example, it may be desirable to apply a first turbocharger 24a to the exhaust gases exiting a first exhaust manifold 20a and a second turbocharger 24b to the exhaust gases exiting a second exhaust manifold 20b. In such embodiments, a director 22a, 22b in accordance with the present invention may positioned up-stream from each of the turbochargers 24a, 24b.

Figure 5:
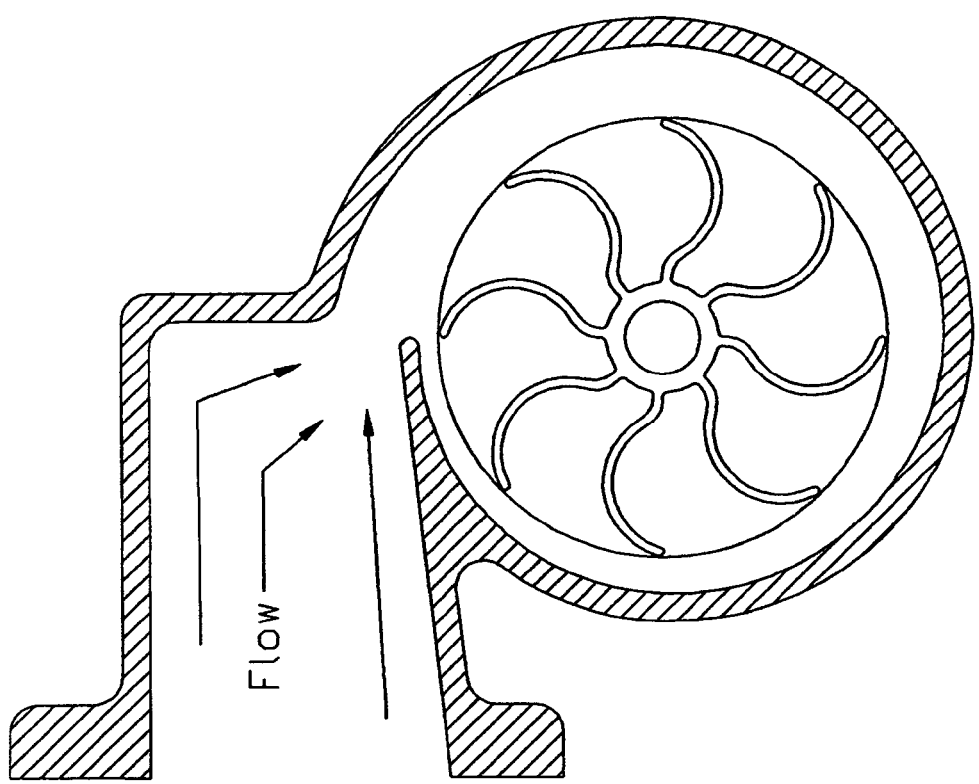
FIG. 5 is a schematic, block diagram of one embodiment of director in accordance with the present invention.

Referring to FIG. 5, in selected embodiments, a director 22 in accordance with the present invention may include a controller 52 and a gate 54. The aperture 30 controlled by the gate 54 has a dual purpose in both bypassing some of the exhaust gases to a location beyond the scrolls 26 and turbine 68 as well as to relieve pressure behind the gate 54 in the cavity 55. For example, if the gate 54 seals the cavity 55, then pressure in the cavity 55 will resist further opening of the gate 54. Relief of the gas pressures in the cavity 55 may be accomplished by providing a groove in the gate 54 or in a surface of the cavity 55 promoting passage of any pressurized gases into the aperture 30. As illustrated, the cavity 55 is simply offset a distance providing clearance between its own wall and the gate 54 whereby gases can pass from the cavity 55 into the aperture 30.

The controller 52 may be arranged to manipulate the position of the gate 54. For example, a controller 52 may include a sensor 56, a proportion controller 58, and an actuator 60. The sensor 56 may quantify a characteristic or variable output by an observed entity 62. The magnitude of the variable may be passed to the proportion controller 58. The proportion controller 58 may interpret the magnitude and generate a corresponding command. This command, along with a motive force or energy provided by a source 64, may be passed to the actuator 60. The actuator 60 may then use the motive force or energy to adjust the gate 54 to the extent dictated by the command. If desired, a feedback loop 66 may relay the position of the gate 54 to the proportion controller 42 so that additional adjustments may be made as needed.

A controller 52 in accordance with the present invention may operate electronically, mechanically, hydraulicly, pneumatically, or some combination thereof. For example, the proportion controller 58 may be a programmable logic controller (PLC). The actuator 60 may be a solenoid, stepper motor, or the like. The source 64 may be the electrical system of an automobile. In an alternative embodiment, the actuator 60 may be a valve and the source 64 the oil pump of the engine 12.

The proportioning of exhaust gases enforced by a director 22 may correspond to a variable collected from the observed entity 62. This correspondence may be manifest as a gradual redirection tracking the magnitude of the variable or as a rapid redirection when the variable crosses preselected thresholds.

An observed entity 62 in accordance with the present invention may be any part or portion of an internal combustion engine 12 from which information corresponding to volumetric flow of exhaust gases may be extracted. For example, in selected embodiments, the observed entity 62 may be the crank shaft of the engine 12. The variable quantified by the sensor 56 may then be the rotational velocity of the crank shaft. Since volumetric flow of exhaust gases is directly proportional to the rotational velocity of a crank shaft, the proportioning option enforced by the director 22 may be selected based on meeting, exceeding, or falling below a particular engine speed (e.g. RPM).

In an alternative embodiment, the exhaust manifold 20 may be the observed entity 62. In such an arrangement, the pressure within the exhaust manifold 20 may be the variable. Because the mean pressure within the exhaust manifold increases with increasing volumetric flow of exhaust gases, the proportioning option enforced by the director 22 may be selected based on meeting, exceeding, or falling below a particular exhaust manifold pressure. Other suitable variables upon which proportioning decisions may be based are intake manifold pressure, volumetric flow of exhaust gases, and the like.

Figure 6:
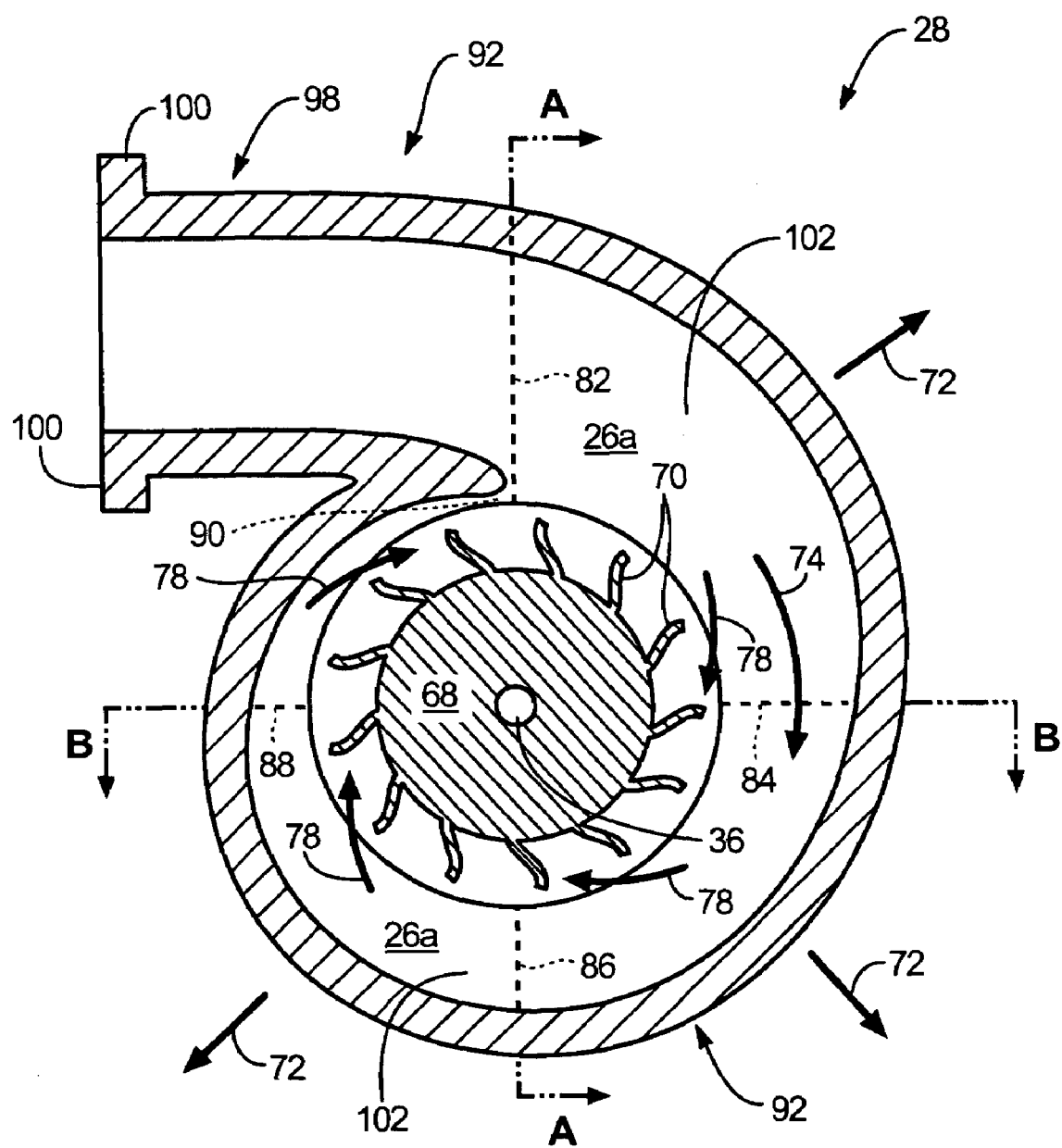
FIG. 6 is a side, cross-sectional view of a turbine in accordance with the present invention.
Figure 7:
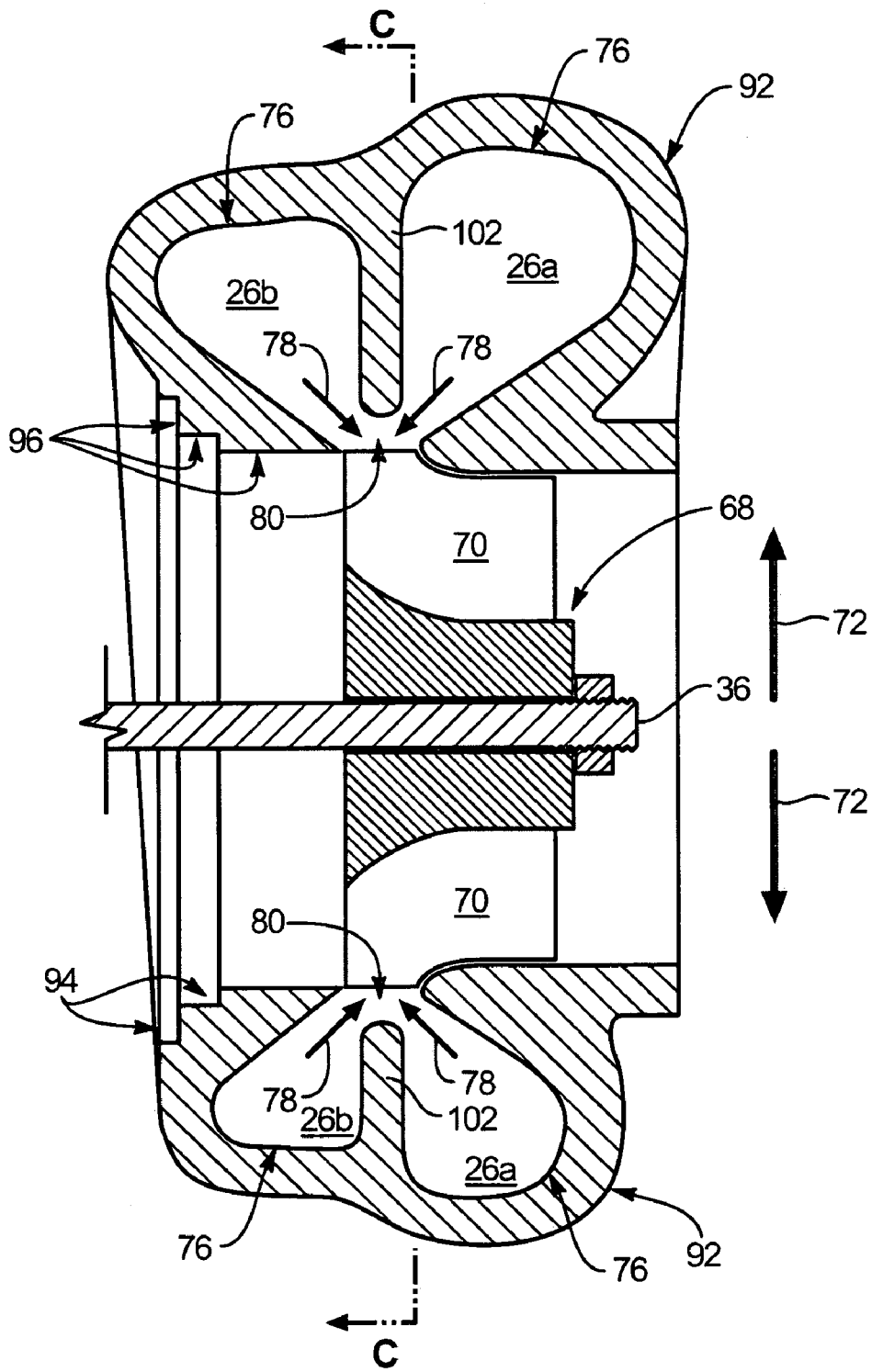
FIG. 7 is a front, cross-sectional view of the turbine of FIG. 6 illustrating scroll cross-sections at 0 and 180 degrees.
Figure 8:
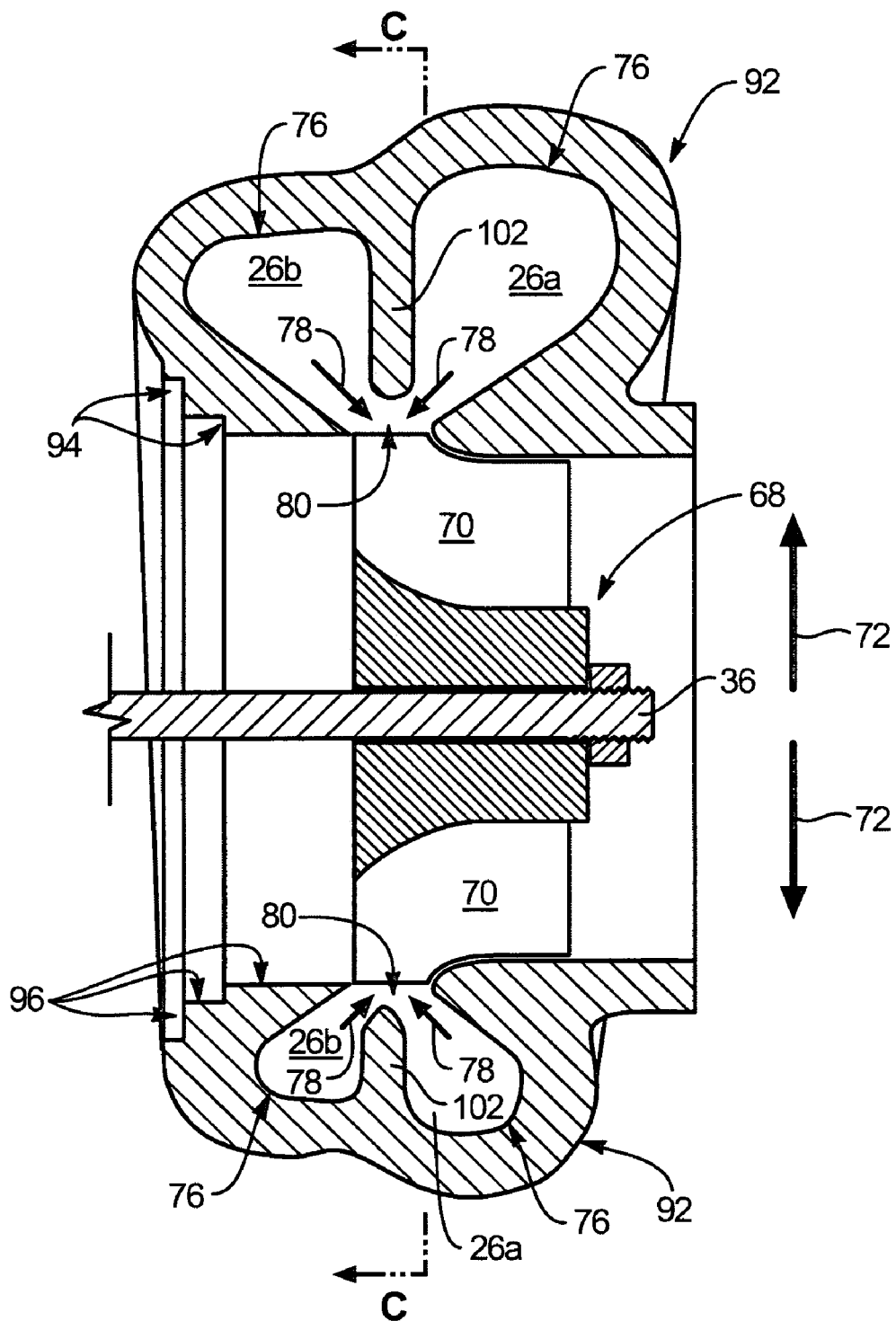
FIG. 8 is a bottom, cross-sectional view of the turbine of FIG. 6 illustrating scroll cross-sections at 90 and 270 degrees.

Referring to FIGS. 6-8, a turbine 28 in accordance with the present invention may include a turbine wheel 68 surrounded by at least two scrolls 26. The turbine wheel 68 may be secured to rotate with a drive shaft 36. In certain embodiments, the turbine wheel 68 may include blades 70 extending in a radial direction 72 with respect to the shaft 36. The scrolls 26 may direct exhaust gases supplied thereto toward the blades 70 of the turbine wheel 68 to cause rotation thereof.

In certain embodiments, a scroll 26 may extend in a circumferential direction 74 around a turbine wheel 68. A scroll 26 may be arranged to have a gradually decreasing cross-sectional area 76. This decreasing cross-sectional area 76 may gradually force 78 exhaust gases flowing in a circumferential direction 76 within the scroll 26 to exit out a throat 80 or nozzle 80. The throat 80 may direct the exhaust gases flowing therethrough against the blades 70 of the turbine wheel 68. Accordingly, the momentum of the exhaust gases may be transferred to the turbine wheel 68. Various arrangements and shapes of blades 70 may be used to control the extent of (e.g. maximize) this momentum exchange.

In selected embodiments, the cross-sectional area 76 of a scroll 26 may decrease approximately twenty-five percent for every ninety degrees of rotation. For example, a scroll 26 may have a full cross-sectional area 26 at zero degrees 82, seventy-five percent of the full cross-sectional area 76 at ninety degrees 84, fifty percent of the full cross-sectional area 76 at one hundred eighty degrees 86, and twenty-five percent of the full cross-sectional area 76 at two hundred seventy degrees 88. Under such an arrangement, the cross-sectional area 76 may decrease to substantially zero as the scroll 26 nears three hundred sixty degrees 90. Accordingly, substantially all of the exhaust gases may be applied to the turbine wheel 68 before they make a complete revolution therearound.

In certain embodiments, scrolls 26 may formed within the housing 92 of the turbine 68. The housing 92 may have any suitable shape or configuration to provide desired volumes, cross-sectional areas 76, flow patterns, etc. for the scroll 26. For example, the housing 92 may include a partition to divide what would otherwise be a single scroll 26 into two scrolls 26a, 26b. In selected embodiments, the housing 92 may provide scrolls 26 having cross-sectional areas 76 patterned after high-flow elbows to reduce losses within the flow of exhaust gases.

The housing 92 may also be shaped to accommodate thermal expansion, improve heat transfer, minimize material usage, improve formability, interface with other components, and the like. For example, the housing 92 may include various shoulders 94 and surfaces 96 to interface with bushings supporting the drive shaft 36, engage the compressor 34, and the like. The housing 92 may also provide an extension 98 to direct exhaust gases from the exhaust system 16 to the scrolls 26. An extension 98 may have any suitable shape to facilitate application thereof to the exhaust system 16. For example, in selected embodiments, the extension 98 may be formed with a flange 100 to facilitate bolting, clamping, or other securement.

Turbines 28 in accordance with the present invention may be formed of any suitable material or combination of materials. Suitable materials may be selected based on the requirements of the various components. For example, the turbine wheel 68 and housing 92 of a turbine 28 may be in contact with hot exhaust gases for extended periods of time. Accordingly, a turbine 28 may be formed of a material meeting a selected level of heat resistence. The mass of a turbine wheel 68 may affect turbo lag. Accordingly, a turbine wheel 68 may be formed of a material having a minimal density to lower the rotational inertial thereof. Other characteristics that may be considered in selecting materials for turbines 68 in accordance with the present invention may be rigidity, formability, machinability, availability, cost, and the like. Suitable materials may include metals, metal alloys, ceramics and the like.

For engines 12 that operate a constant speed (i.e. expel a constant volumetric flow of exhaust gases), a turbine 28 may be selected having a scroll 26 with a cross-sectional area 76 sized to direct gases against the blades 70 with a relatively constant impingement velocity. The cross-sectional area 76 of the scroll 26 may be selected so that the impingement velocity corresponds to optimal performance of the turbine 28.

In other applications, engines 12 must operate over a wide range of speeds. In such cases, the volumetric flow of exhaust gases will vary with the speed of the engine 12. Accordingly, a scroll 26 with a fixed cross-sectional area 76 will provide a different impingement velocity with each different volumetric flow of exhaust gases. Thus, a turbine 28 so arranged will operate outside its optimal performance for a significant percent of the time.

To maintain the impingement velocity of exhaust gases within optimal ranges, it may be desirable to provide a scroll 26 with varying cross-sectional area 76. Varying cross-sectional area 76 may be defined as the ability to increase effective cross-sectional area 76 of a scroll 26 at a particular circumferential position. This may be contrasted to varying cross-sectional area 76 while traveling in the circumferential direction 74. An example of the former is a scroll 26 with a zero degree 82 cross-sectional area 76 of X converting to a zero degree 82 cross-sectional area 76 of 2X. An example of the latter would be a scroll 26 with a zero degree 82 cross-section area 76 of X, a ninety degree 84 cross-sectional area 76 of 0.75X, etc., where the cross-section area 76 at zero degrees 82 is never anything but X and the cross-sectional area 76 at ninety degrees 84 is never anything but 0.75X, etc.

One way of providing a scroll 26 that varies in cross-sectional area 76 is to use a turbine housing 92 having multiple scrolls 26a, 26b in combination with a director 22. The director 22 may control which scroll 26a, 26b receives the flow of exhaust gases. By directing exhaust gases to a first scroll 26a, the effective cross sectional area 76a at zero degrees 82 may be X. By directing exhaust gases to a second scroll 26b, the effective cross-sectional area 76b at zero degrees 82 may be Y. By directing exhaust gases to both the first and second scrolls 26a, 26b, the effective cross-sectional area 76a, 76b at zero degrees 82 may be X+Y. Thus, a single turbine wheel 68 may be served by a scroll 26 that varies in cross-sectional area 76 in order to maintain impingement velocity near optimal levels.

Figure 9:
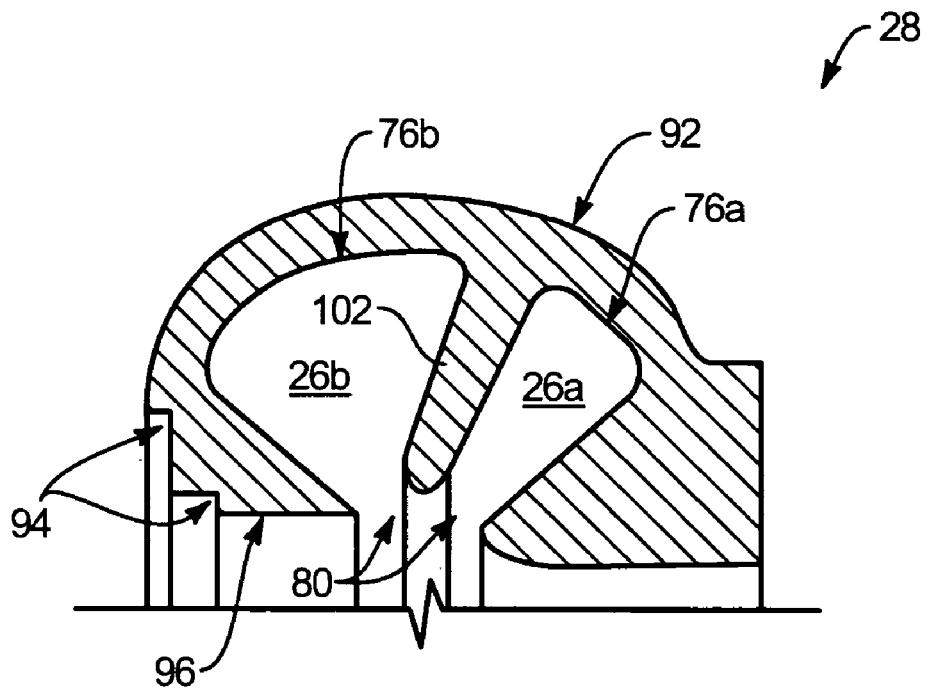
FIG. 9 is a partial, cross-sectional view of a two-scroll turbine housing with an angled partition generating asymmetric scrolls.
Figure 10:
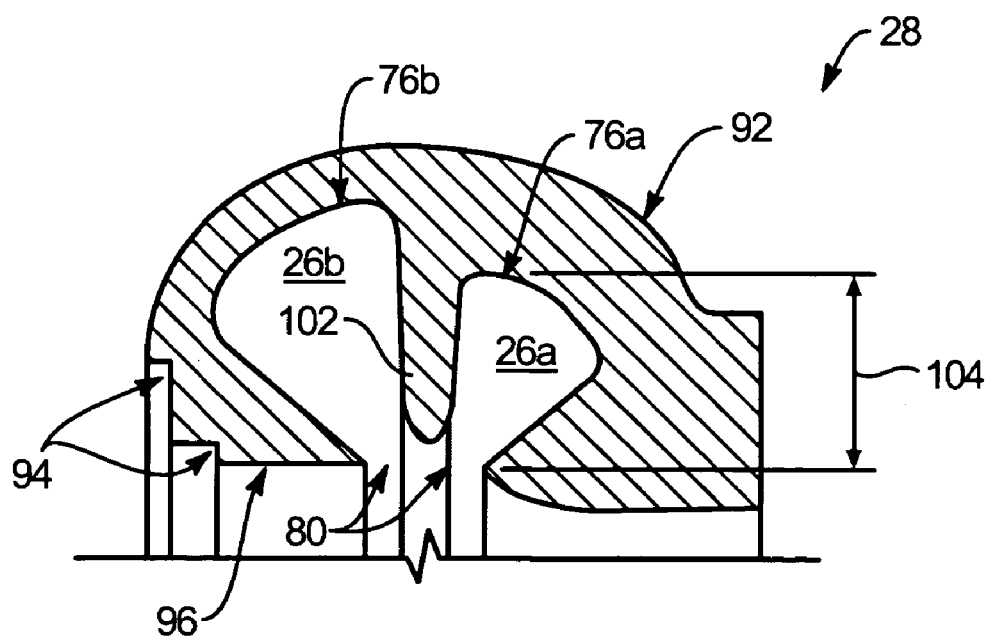
FIG. 10 is a partial, cross-sectional view of a two-scroll turbine housing with asymmetric scrolls generated by one scroll having a lower height than the other.

Referring to FIGS. 9 and 10, in multi-scroll embodiments, a housing 92 may provide symmetric or asymmetric scrolls 26. With symmetric scrolls 26, a partition 102 may evenly divide the housing 92 into two or more scrolls 26a, 26b of substantially equal cross-sectional areas 76a, 76b. With asymmetric scrolls 26, the two or more scrolls 26a, 26b may have unequal cross-sectional areas 76a, 76b.

Asymmetric scrolls 26 may be formed in various ways. For example, as shown in FIG. 9, a partition 102 may be angled to decrease the cross-sectional area 76a of one scroll 26a while increasing the cross-sectional area 76b of the other scroll 26b. In an alternative embodiment, as shown in FIG. 10, the partition 102 may be centrally located, but the height 104 of one scroll 26a may be altered to increase or decrease the cross-sectional area 76a. By controlling the position of the partitions 102 and the heights 104 of the various scrolls 26, a wide variety of cross-sectional areas 76 may be achieved.

Figure 11:
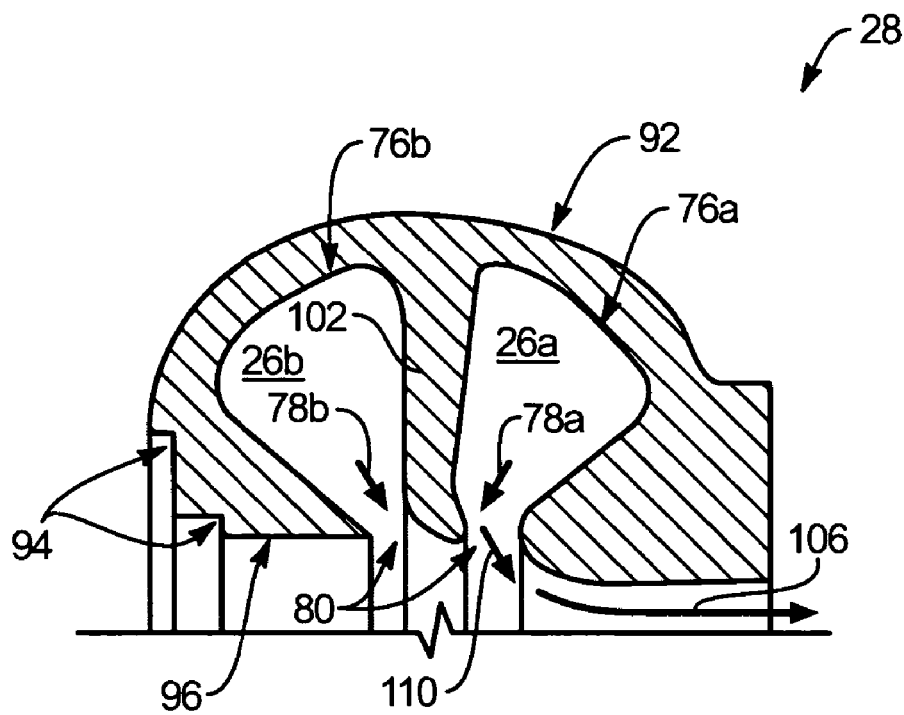
FIG. 11 is a partial, cross-sectional view of a two-scroll turbine housing, the partition between the two scrolls having lip to modify the direction of exhaust gases exiting the scrolls.

Referring to FIG. 11, a partition 102 in accordance with the present invention may be shaped to affected the flow of exhaust gases through the throat 80. Exhaust gases leaving a first scroll 26b may be forced 78b in a direction generally aligned with the flow 106 of exhaust gases through the blades 70 of the turbine wheel 68. A second scroll 26a, however, may force 78a exhaust gases in a direction that is not generally aligned with the flow 106 of exhaust gases through the blades 70. Accordingly, to improve the operating efficiency of the turbine, a lip 108 may be formed on the partition 102 to redirect 110 the flow exiting the second scroll 26a to greater alignment with the flow 106 of exhaust gases through the blades 70.

Figure 12:
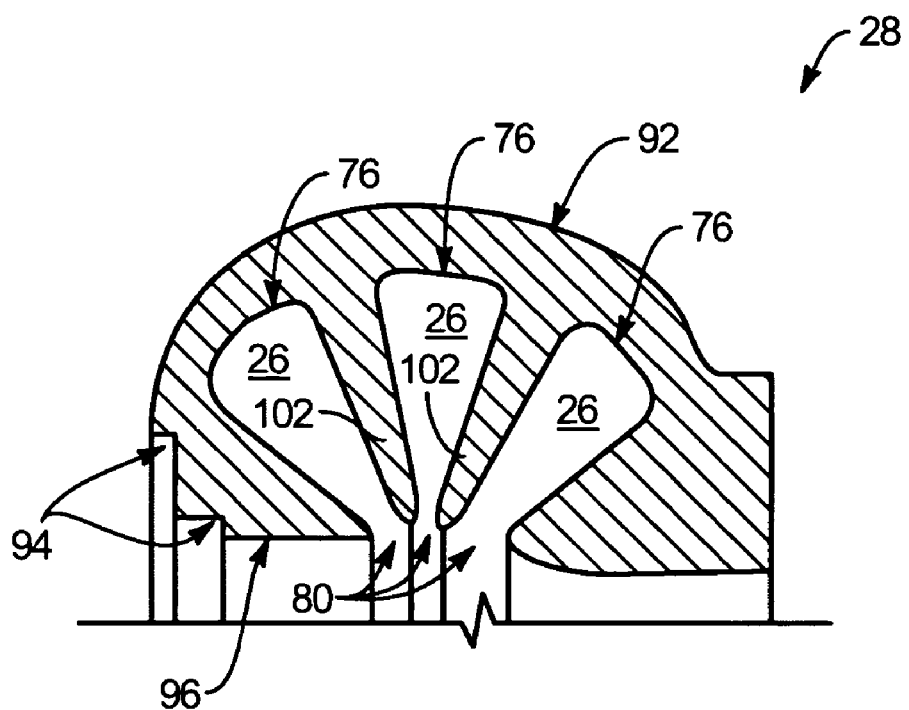
FIG. 12 is a partial, cross-sectional view of a three-scroll turbine housing.

Referring to FIG. 12, in certain embodiments, it may be desirable to employ a turbine 28 having more than two scrolls 26. For example, in one embodiment, three scrolls 26 may provide optimal performance. In such an embodiment, more than one partition 102 may be employed. While the illustrated embodiment depicts three scrolls 26 having substantially equal cross-sectional areas 76, different scrolls 26 may have different cross-sectional areas 76.

Referring to FIGS. 13-16, a director 22 in accordance with the present invention may block, deflect, divide, proportion, or otherwise control the flow of exhaust gases into a turbocharger 24. In selected embodiments, a director 22 may be formed as a gate 54 rotating about a pivot 112. In such an arrangement, the gate 54 may pivot into and out of a portion of exhaust conduit 114, positioned somewhere along the exhaust system 16 between the cylinder 14 and the turbine wheel 68, to exert control over the flow 116 of exhaust gases.

Upstream from the director 22 may be a single upstream conduit 118. Downstream from the director 22 may be two or more downstream conduits 120a, 120b. The gate 54, operating under the direction of the controller 52, may determine how much of the flow 116 of exhaust gases enters any particular downstream conduit 120.

Each downstream conduit 120 may be in fluid communication with a corresponding scroll 26. In some embodiments, downstream conduits 120 may extend significant distances within the exhaust system 16 before encountering a scroll 26. In other embodiments, the downstream conduits 120 may be the scrolls 26 themselves. The arrangement of the engine 12 as well as the engine compartment may determine the positioning of the director 22 and the length of the downstream conduits 120 with respect to the scrolls 26.

Figure 13:
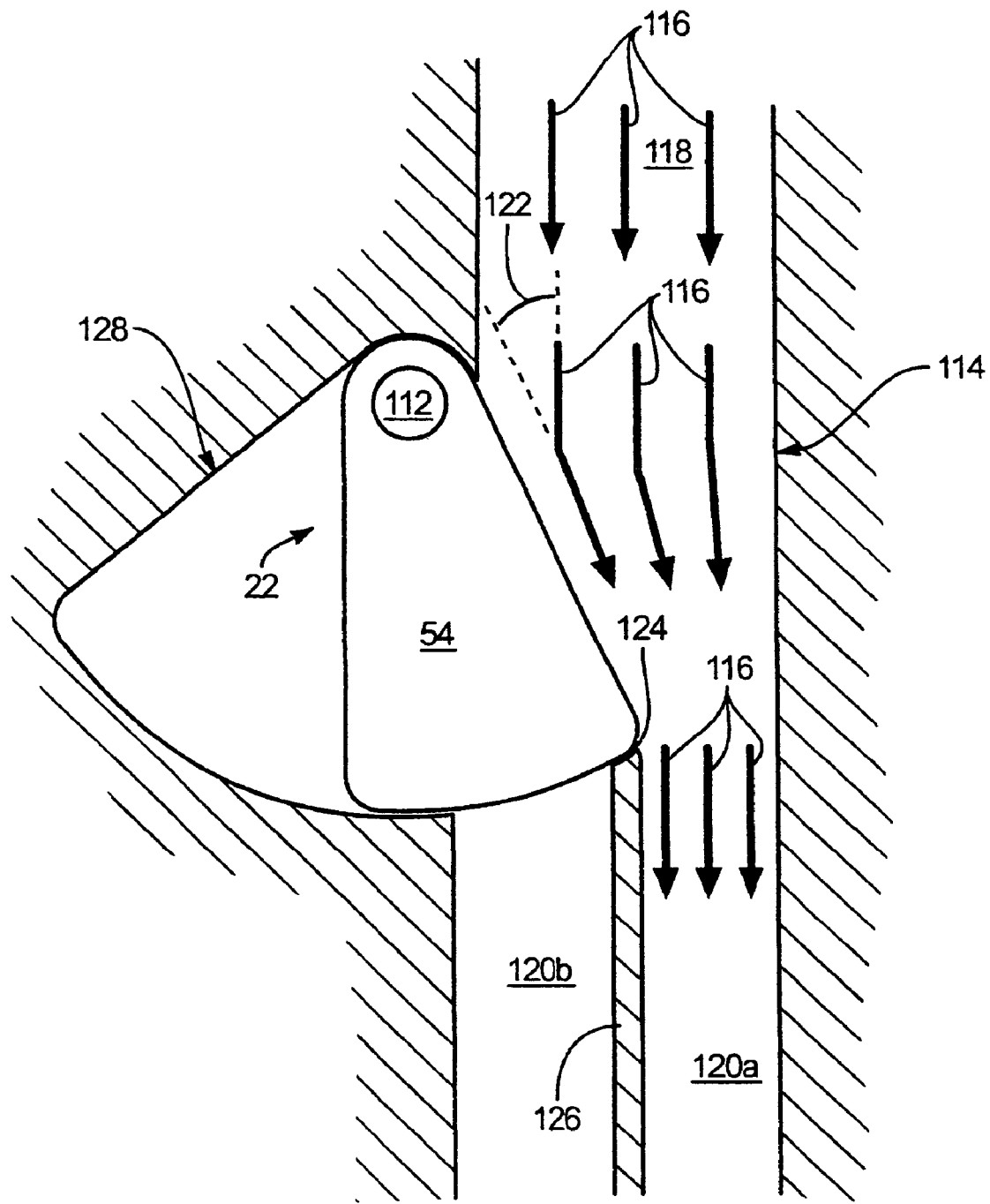
FIG. 13 is a top, cross-sectional view of one embodiment of a pivoting director positioned to direct exhaust gases to a single downstream conduit in accordance with the present invention.

Referring specifically to FIG. 13, at relatively low volumetric flows of exhaust gases, a director 22 may direct all or a larger portion of the flow 116 into a first downstream conduit 120a corresponding to a first scroll 26a. In such an arrangement, the gate 54 may be positioned to direct the flow 116 with minimal disruption. This may be accomplished by imposing less than a ninety degree change in direction 122.

In certain embodiments, a stop 124 may be positioned to limit the maximum extension of the gate 54 into the exhaust conduit 114. In one embodiment, a divider 126 between the downstream conduits 120a, 120b may provide the stop 124. A pocket 128 or recess 128 may be formed behind the gate 54. The pocket 128 may provide clearance for the gate 54 as it rotates out of the exhaust conduit 114. If desired, the pocket 128 may be closely formed to the shape of gate 54 to resist the passage of exhaust gases to a location behind the gate 54. In certain embodiments, the pocket 128 may limit the maximum retraction of the gate 54 from the exhaust conduit 114.

Figure 14:
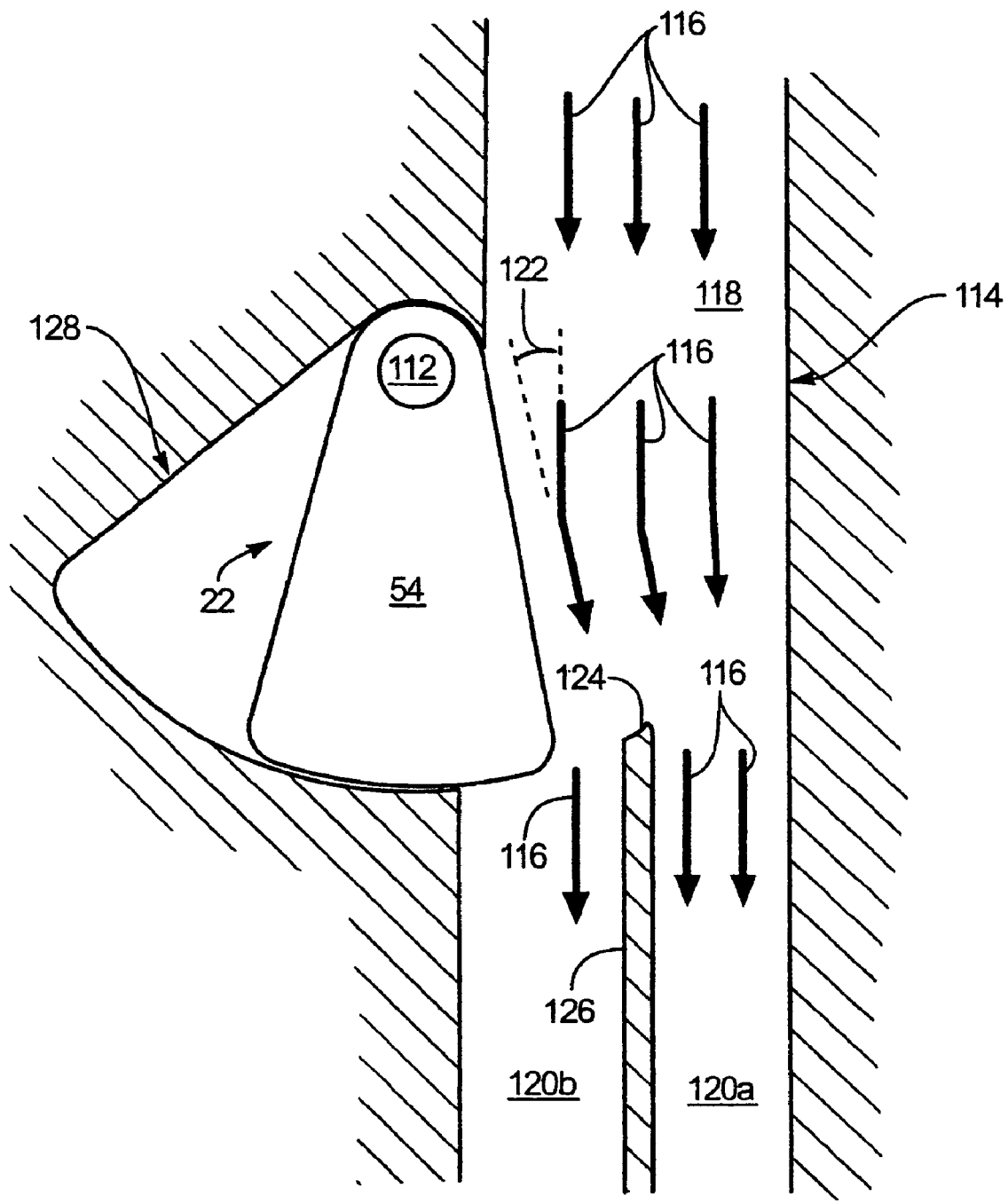
FIG. 14 is a top, cross-sectional view of the pivoting director of FIG. 13 positioned to direct exhaust gases to both downstream conduits in accordance with the present invention.

Referring specifically to FIG. 14, at relatively medium volumetric flows of exhaust gases, a director 22 may direct the flow 116 into both the first and second scrolls 26a, 26b. In one embodiment, as shown, the director 22 may gradually withdraw from the exhaust conduit 114 as the volumetric flow of exhaust gases increases. In such an arrangement, the director 22 may continue to direct the majority of the exhaust gases to the first scroll 26a, yet permit any excess to enter the second scroll 26b. Accordingly, the first scroll 26a may continue to apply exhaust gases to the turbine wheel 68 at near optimal impingement velocity while the volumetric flow needed for optimal performance of the second scroll 26b is not yet obtained. In an alternative embodiment, the director 22 may completely expose the second scroll 26b once a particular threshold of volumetric flow of exhaust gases is passed.

Figure 15:
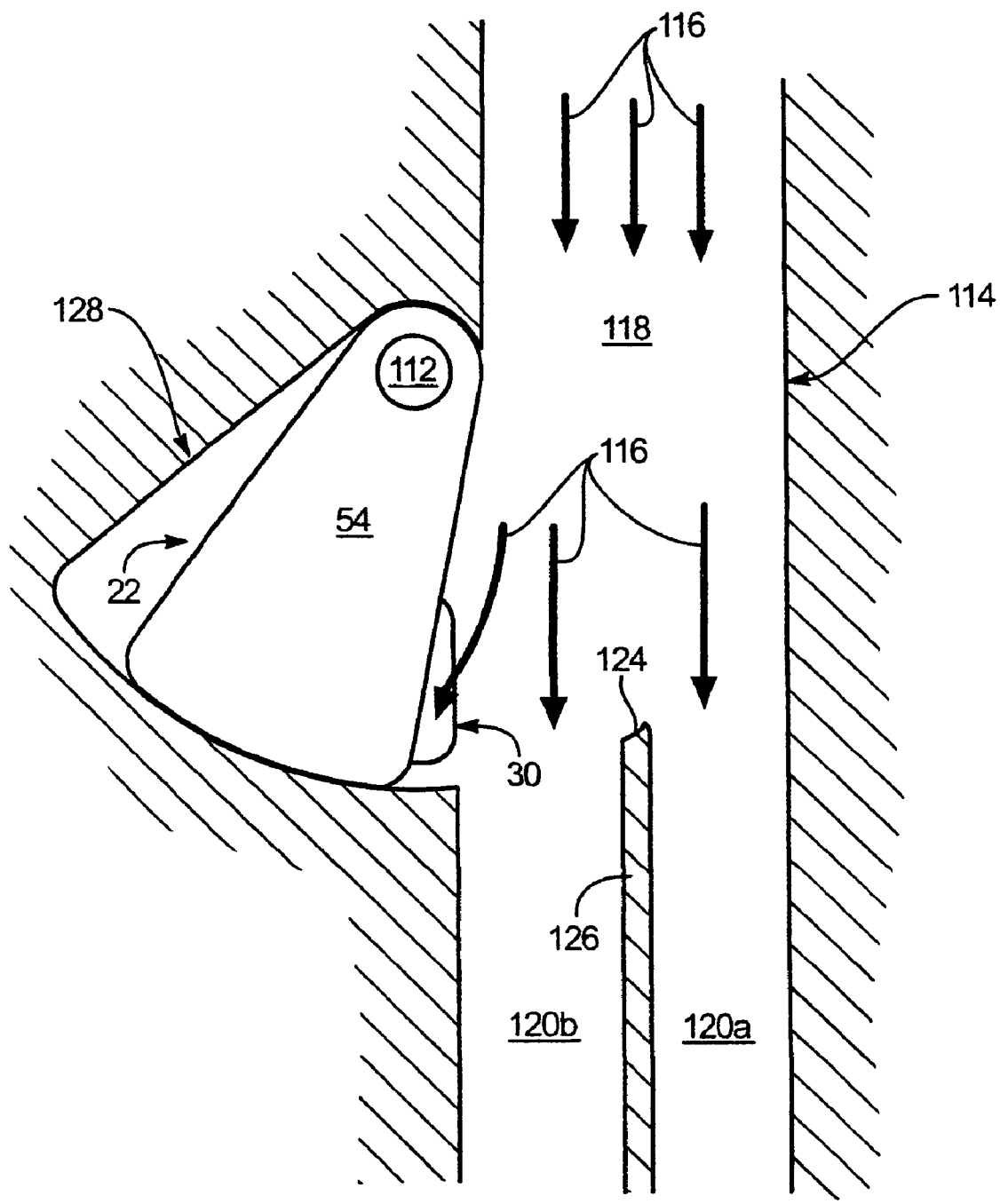
FIG. 15 is a top, cross-sectional view of the pivoting director of FIG. 13 positioned to permit exhaust gases to flow into both downstream conduits and a portion of a bypass in accordance with the present invention.

Referring specifically to FIG. 15, at higher volumetric flows of exhaust gases, a director 22 may direct the exhaust gases to the first and second scrolls 26a, 26b, while exposing a portion of the bypass 30. Accordingly, the first and second scrolls 26a, 26b may continue to apply exhaust gases to the turbine wheel 68 at near optimal impingement velocity while any excess flow 116 may enter the bypass 30 without causing undue back pressure within the exhaust manifold 20.

Figure 16:
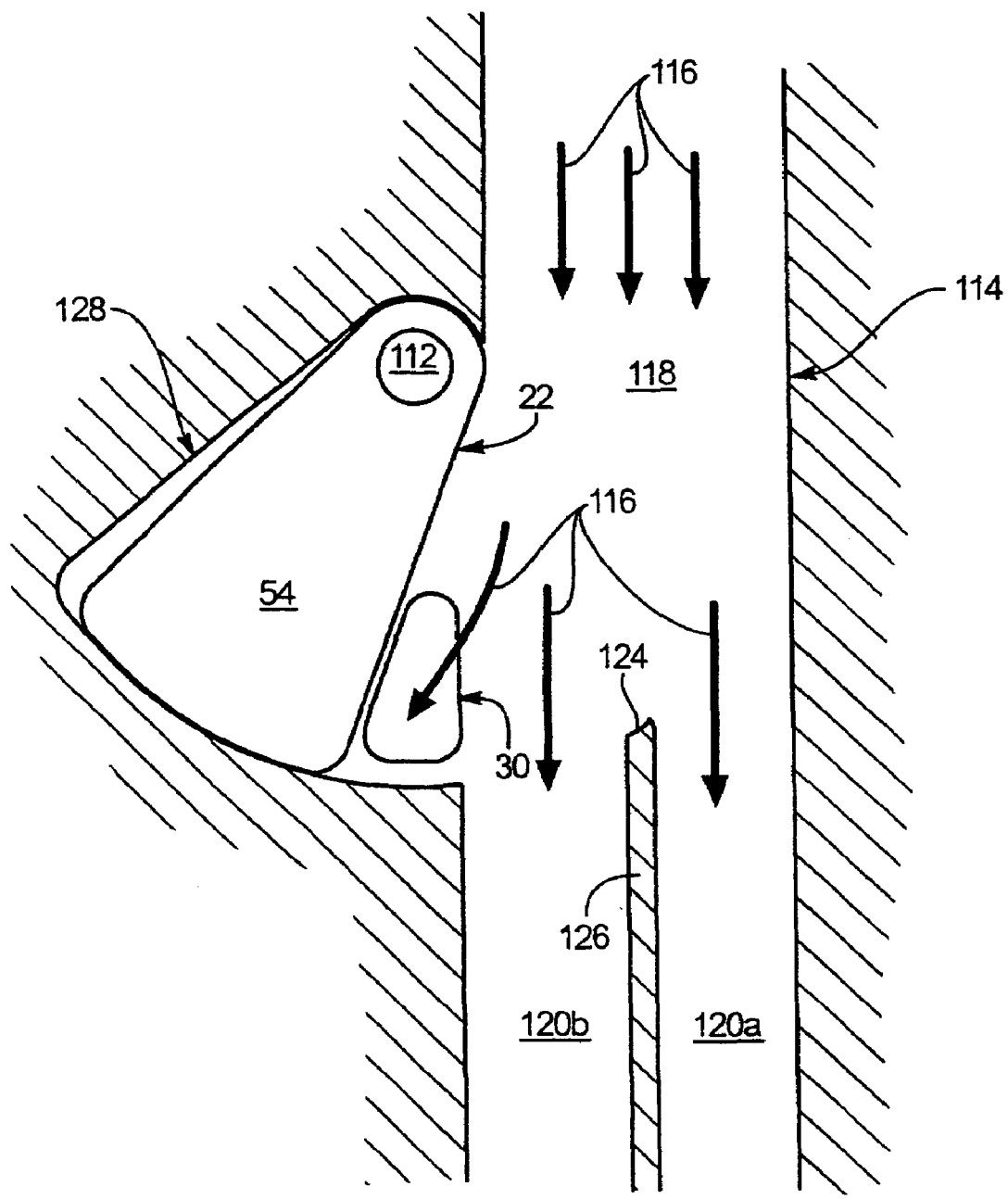
FIG. 16 is a top, cross-sectional view of the pivoting director of FIG. 13 positioned to permit exhaust gases to flow into both downstream conduits and the entire bypass in accordance with the present invention.

Referring specifically to FIG. 16, at relatively high volumetric flows of exhaust gases, a director 22 may direct the exhaust gases to the first and second scrolls 26a, 26b while exposing the entire bypass 30. In such an arrangement, the principles of gas dynamics may regulate how the total volume of exhaust gases divides between the first scroll 26a, second scroll 26b, and bypass 30.

Figure 17:
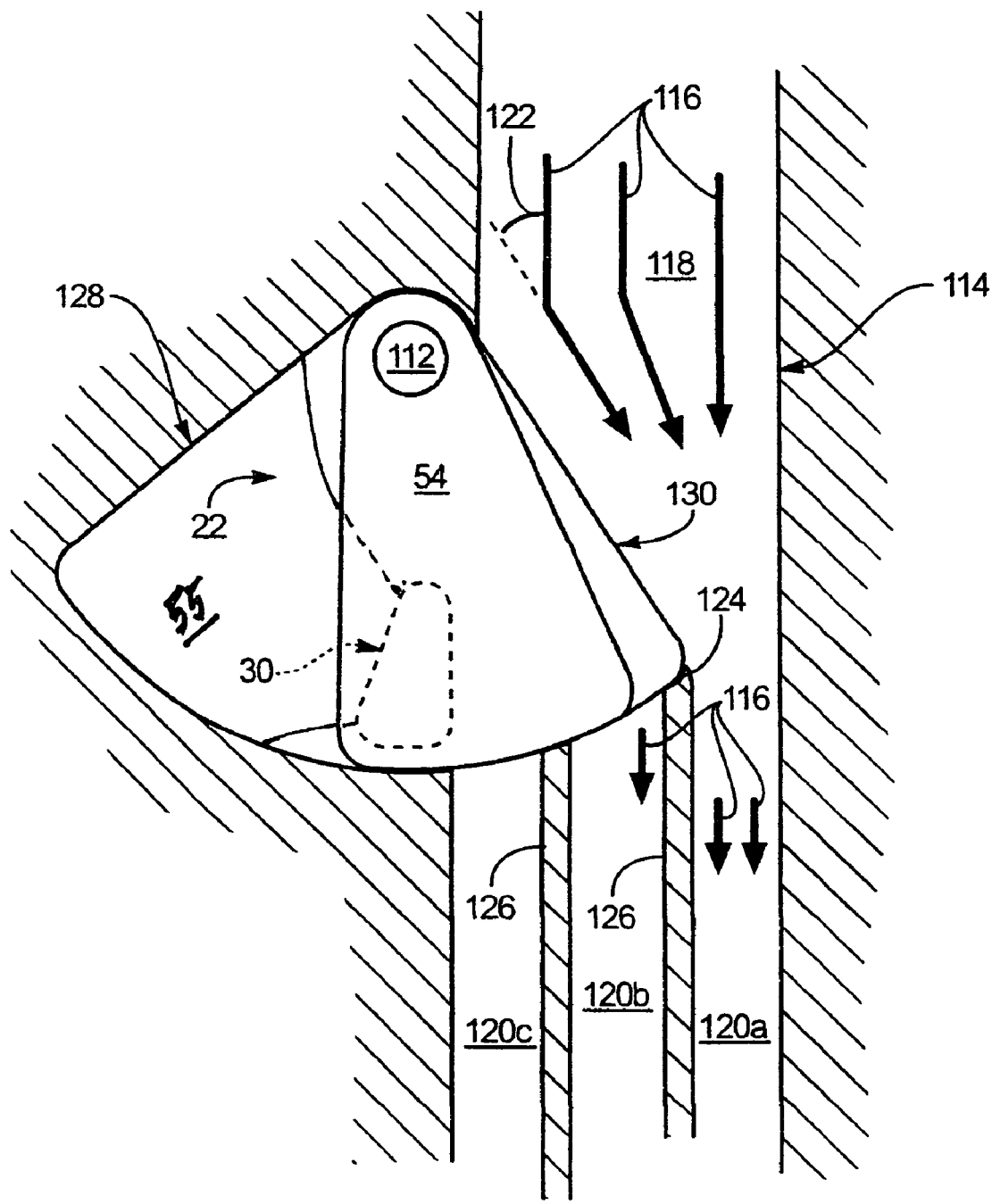
FIG. 17 is a top, cross-sectional view of a pivoting director for controlling the distribution of exhaust gases between three downstream conduits and a bypass in accordance with the present invention.

Referring to FIG. 17, in certain embodiments, a director 22 in accordance with the present invention may block, deflect, divide, proportion, or otherwise control the flow of exhaust gases into more than two scrolls 120. For example, upstream from the director 22 may be a single upstream conduit 118. Downstream from the director 22 may be three downstream conduits 120a, 120b, 120c. The gate 54, operating under the direction of the controller 52, may determine how much of the flow 116 of exhaust gases enters any particular downstream conduit 120.

At relatively low volumetric flows of exhaust gases, a director 22 may direct all or substantially all of the exhaust gases into a first downstream conduit 120a. At relatively medium volumetric flow of exhaust gases, a director 22 may direct all or substantially all of the exhaust gases into the first downstream conduit 120a and a second downstream conduit 120b. At relatively high volumetric flow of exhaust gases, a director 22 may direct all or substantially all of the exhaust gases into the first downstream conduit 120a, the second downstream conduit 120b, and a third downstream conduit 120c. At very high volumetric flow of exhaust gases, a director 22 may direct exhaust gases to all three downstream conduits 120a, 120b 120c and allow any excess to enter a bypass 30. As with other embodiments, a director 22 may gradually withdraw from the exhaust conduit 114 as the volumetric flow of exhaust gases increases or transitions between the various positions relatively rapidly as particular thresholds of volumetric flow of exhaust gases are passed.

In selected embodiments, a gate 54 may extend to a height greater than the height of an exhaust conduit 114. In such cases, it may be desirable to provide a pocket 130 or recess 130 in the exhaust conduit 114 to accommodate this additional height. In certain embodiments, a recess 130 may be placed to accommodate the top and bottom of the gate 54. If desired, one or more recesses 130. may provide a stop 124 limiting maximum extension of the gate 54 into the exhaust conduit 114, maximum retraction of the gate 54 from the exhaust conduit 114, or both.

Figure 18:
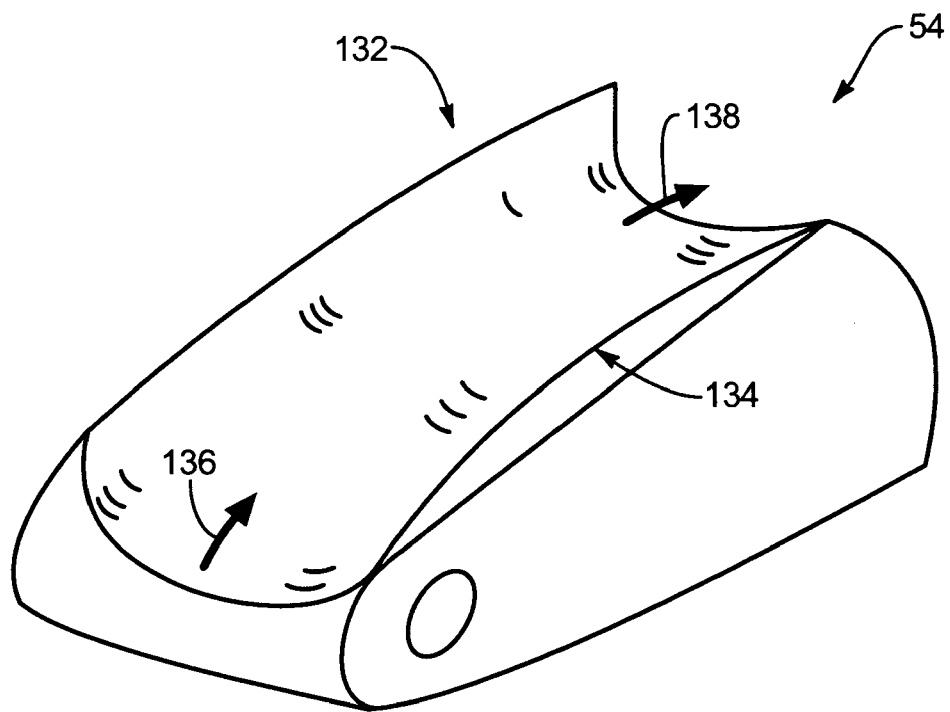
FIG. 18 is a perspective view of a gate having a contoured face to redirect flow of exhaust gases in accordance with the present invention.
Figure 19:
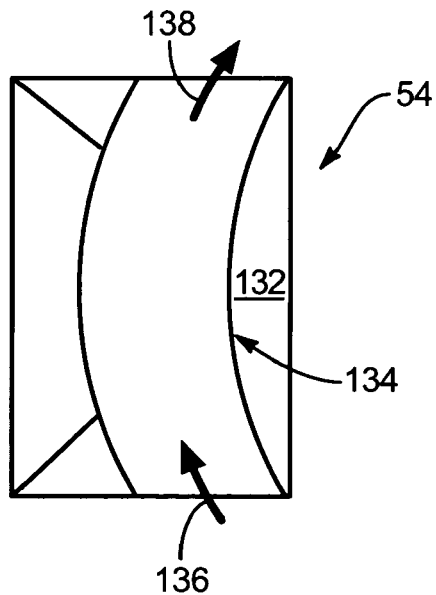
FIG. 19 is a top, plan view of the gate of FIG. 18.

Referring to FIGS. 18 and 19, in certain embodiments, a director 22 may provide a transition for the flow of exhaust gases. A transition may be defined as a redirection of exhaust gases through the use of smooth curves and bends. Transitions minimize resistance to flow and maintain momentum amount, if not direction, which may reduce back pressure on the engine 12 as well as quiet an exhaust system 16. In selected applications, it may be undesirable to place a transition before or after a director 22. In such cases, the director 22 may be shaped to assist in providing the transition.

In one embodiment, a gate 54 may have a face 132 contoured to provide a transition. For example, the face 132 may have a channel 134 formed therein. The shape and size of the channel 134 may correspond to the surrounding exhaust conduit 114. The channel 134 may receive exhaust gases in one direction 136 and assist in gradually redirecting them to another 138. This redirection may be two-dimensional or three-dimensional.

Figure 20:
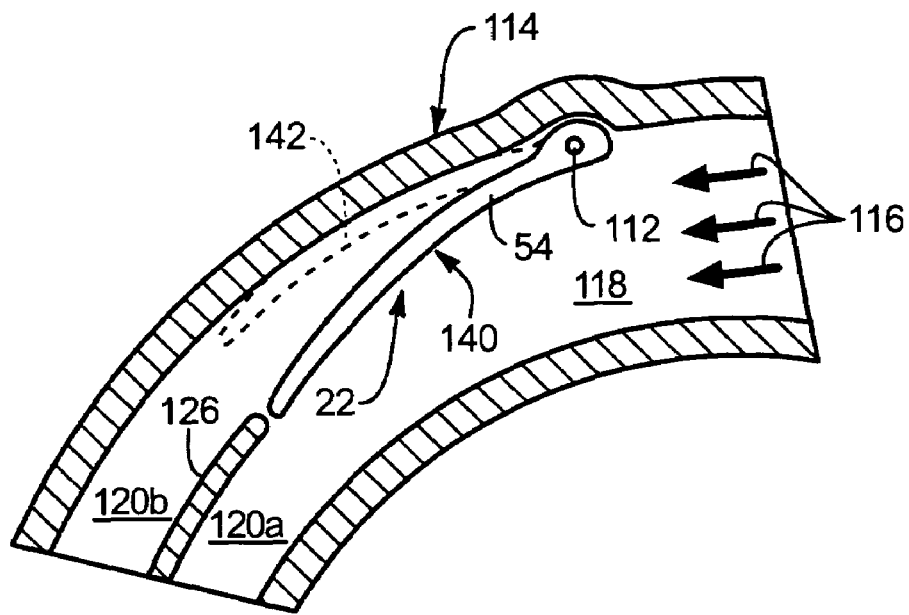
FIG. 20 is a top, cross-sectional view of a pivoting director for controlling the distribution of exhaust gases in a curved exhaust conduit in accordance with the present invention.

Referring to FIG. 20, a director 22 in accordance with the present invention may be applied to a curved exhaust conduit 114. In such an embodiment, a gate 54 may have a contour or curvature corresponding to the curvature of the exhaust conduit 114. The gate 54 may pivot between various positions 140, 142. In one position 140, the gate 54 may direct exhaust gases to a first downstream conduit 120a. In another position 142, the gate 54 may permit exhaust gases to enter both the first downstream conduit 120a and a second downstream conduit 120b. A contoured gate 54 may be applied to arrangements have two, three, or more downstream conduits 120.

Figure 21:
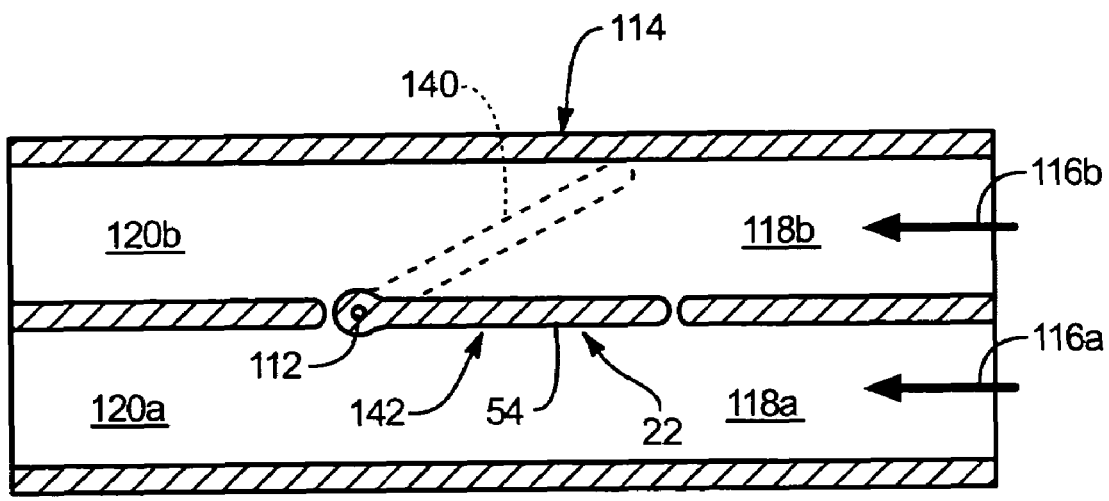
FIG. 21 is a top, cross-sectional view of a pivoting director for controlling the distribution of exhaust gases in a divided exhaust conduit in accordance with the present invention.

Referring to FIG. 21, in certain embodiments, a director 22 in accordance with the present invention may be applied to an exhaust system 16 having multiple upstream conduits 118. For example, in an exhaust system 16 utilizing two exhaust manifolds 20a, 20b, a first upstream conduit 118a may conduct the flow 116a from one exhaust manifold 20a, while a second upstream conduit 118b conducts flow 116a from the other exhaust manifold 20b.

During certain periods of operation or certain engine speeds, it may be desirable to limit the amount of exhaust gases from one exhaust manifold 20a that enter another exhaust manifold 20b. However, at other periods or speeds, neither manifold 20a, 20b may deliver exhaust gases in sufficient volume to be properly applied by a scroll 26a, 26b to a turbine wheel 68. Accordingly, a director 22 may be placed within a divided exhaust conduit 114. At low volumetric flows of exhaust gases, a gate 54 may be placed in a first position 140 to direct the flow from both the first and second upstream conduits 118a, 118b into a first downstream conduit 120a. At higher volumetric flows of exhaust gases, the gate 54 may be placed in a second position 142 to direct the flow from the first upstream conduit 118a into the first downstream conduit 120a and flow from the second upstream conduit 118b into a second downstream conduit 120b.

Figure 22:
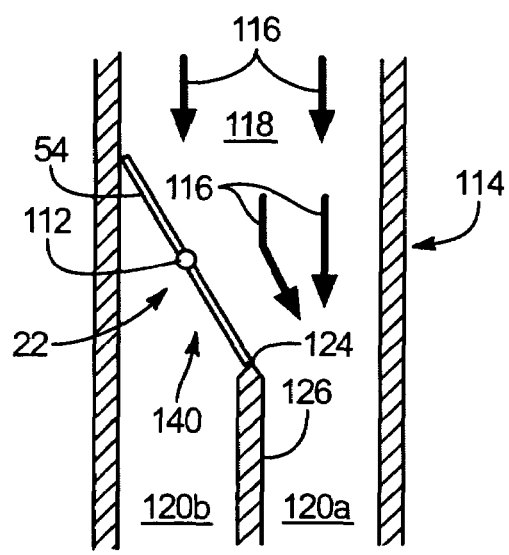
FIG. 22 is a top, cross-sectional view of a butterfly valve director positioned to direct the flow of exhaust gases to a first downstream conduit in accordance with the present invention.
Figure 23:
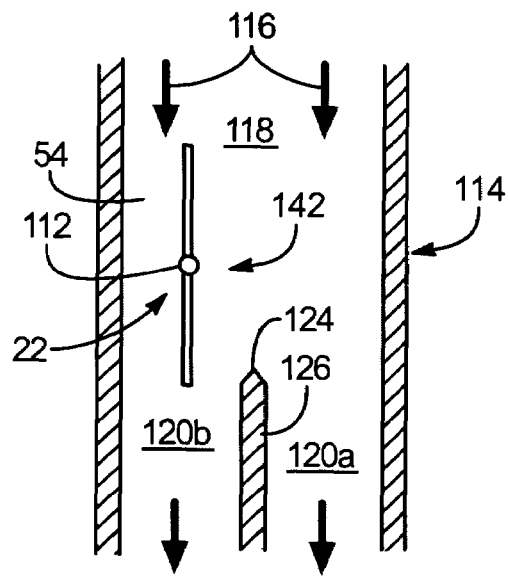
FIG. 23 is a top, cross-sectional view of the butterfly valve director of FIG. 22 aligned to permit the flow of exhaust gases into both downstream conduits.

Referring to FIGS. 22 and 23, a wide variety of mechanisms may act as a director 22 in accordance with the present invention. In certain embodiments, the interior, cross-sectional shape of the exhaust conduit 114 may determine which type of director 22 provides optimal performance. Optimal performance may be determined by considering manufacturability, reliability, ease of installation, cost, effectiveness in directing exhaust gases, disruption of the flow 116, and the like.

In selected embodiments, a director 22 may be arranged as a butterfly valve 22. The butterfly valve 22 may have a profile shaped to match the interior, cross-sectional shape of the exhaust conduit 114. When the butterfly valve 22 is in a first position 140, the flow 116 of exhaust gases may be directed to a first downstream conduit 120a. In a second position 142 aligned with the flow 116, exhaust gases may enter both the first downstream conduit 120a and a second downstream conduit 120b.

Figure 24:
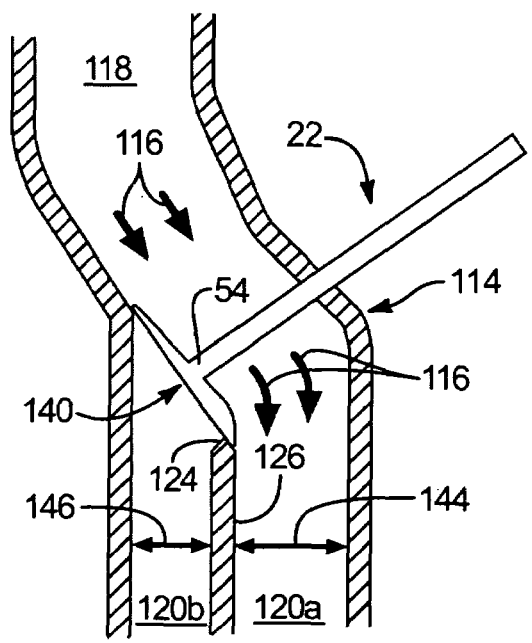
FIG. 24 is a top, cross-sectional view of a poppet valve director positioned to direct the flow of exhaust gases to a first downstream conduit in accordance with the present invention.
Figure 25:
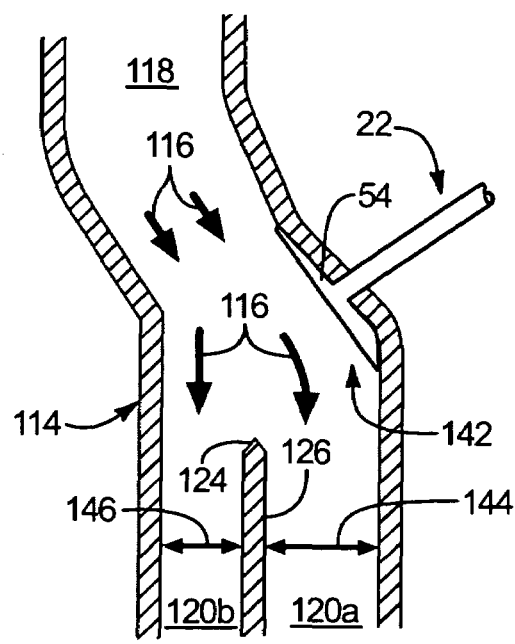
FIG. 25 is a top, cross-sectional view of the poppet valve director of FIG. 24 retracted to permit the flow of exhaust gases into both downstream conduits.

Referring to FIGS. 24 and 25, in selected embodiments, a director 22 may be arranged as a poppet valve 22. A poppet valve 22 may translate between various positions 140, 142 to control the flow 116 of exhaust gases. For example, when the poppet valve 22 is extended to a first position 140, the flow 116 of exhaust gases may be directed to a first downstream conduit 120a. When retracted to a second position 142, the flow 116 of exhaust gases may enter both the first downstream conduit 120a and a second downstream conduit 120b.

The interior dimensions 144, 146, and corresponding cross-sectional areas, of the various downstream conduits 120 may vary. For example, the interior dimensions 144 of a first downstream conduit 120a may be different from the interior dimensions 146 of a second downstream conduit 120b. In certain embodiments, the interior dimensions 144, 146 may be selected to provide cross-sectional areas corresponding to the cross-sectional areas 76 of the scrolls 26. Accordingly, the interior dimensions 144 of a first downstream conduit 120a may create a cross-sectional area substantially equal to the cross-sectional area 76a of the corresponding first scroll 26a. Similarly, the interior dimensions 146 of a second downstream conduit 120b may create a cross-sectional area substantially equal to the cross-sectional area 76b of the corresponding second scroll 26b.

Figure 26:
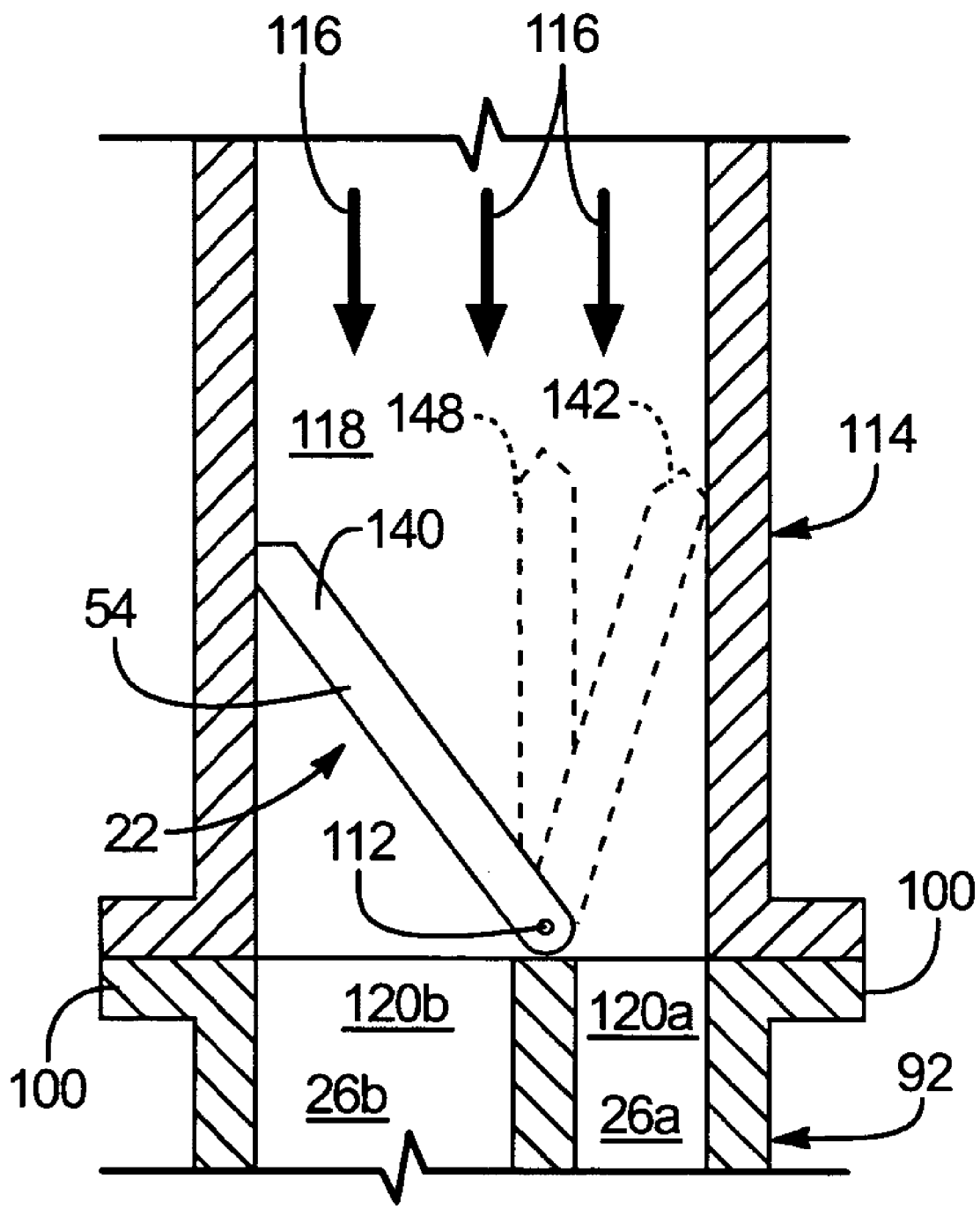
FIG. 26 is a top, cross-sectional view of a three-position director applied directly upstream from a turbine in accordance with the present invention.

Referring to FIG. 26, in selected embodiments, the various scrolls 26 of a turbine 28 may form the downstream conduits 120. In such an embodiment, the director 22 may be positioned directly upstream from the turbine 28.

In certain embodiments, a three-position director 22 may effectively convert a turbine 28 having two scrolls 26 into a turbine 28 having three scrolls 26. For example, at low volumetric flows of exhaust gases, a gate 54 may be placed in first position 140 to direct the flow 116 into a first downstream conduit 120*a*. At an intermediate (comparatively medium) volumetric flow of exhaust gases, the gate 54 may be placed in second position 142 to direct the flow 116 into a second downstream conduit 120*b*. At comparatively high volumetric flows of exhaust gases, the gate 54 may be placed in third position 148 permitting the flow 116 to enter both the first and second downstream conduits 120*a*, 120*b*.

By using such an arrangement and sizing the second scroll 26*b* larger than the first scroll 26*a*, a turbine 28 having three-stages may be produced. For example, the first scroll 26*a* may have a zero degree 82 cross-sectional area 76 of X. The second scroll 26*b* may have a zero degree 82 cross-sectional area 76 of 2X. Accordingly, in the first position, the effective zero degree 82 cross-sectional area 76 may be X. In the second position, the effective zero degree 82 cross-sectional area 76 may be 2X. In the third position, the effective zero degree 82 cross-sectional area 76 may be 3X. These three different cross-sectional areas 76 (i.e. sizes of scrolls 26) may provide near optimal impingement velocities for a wide range of volumetric flows of exhaust gases.

Figure 27:
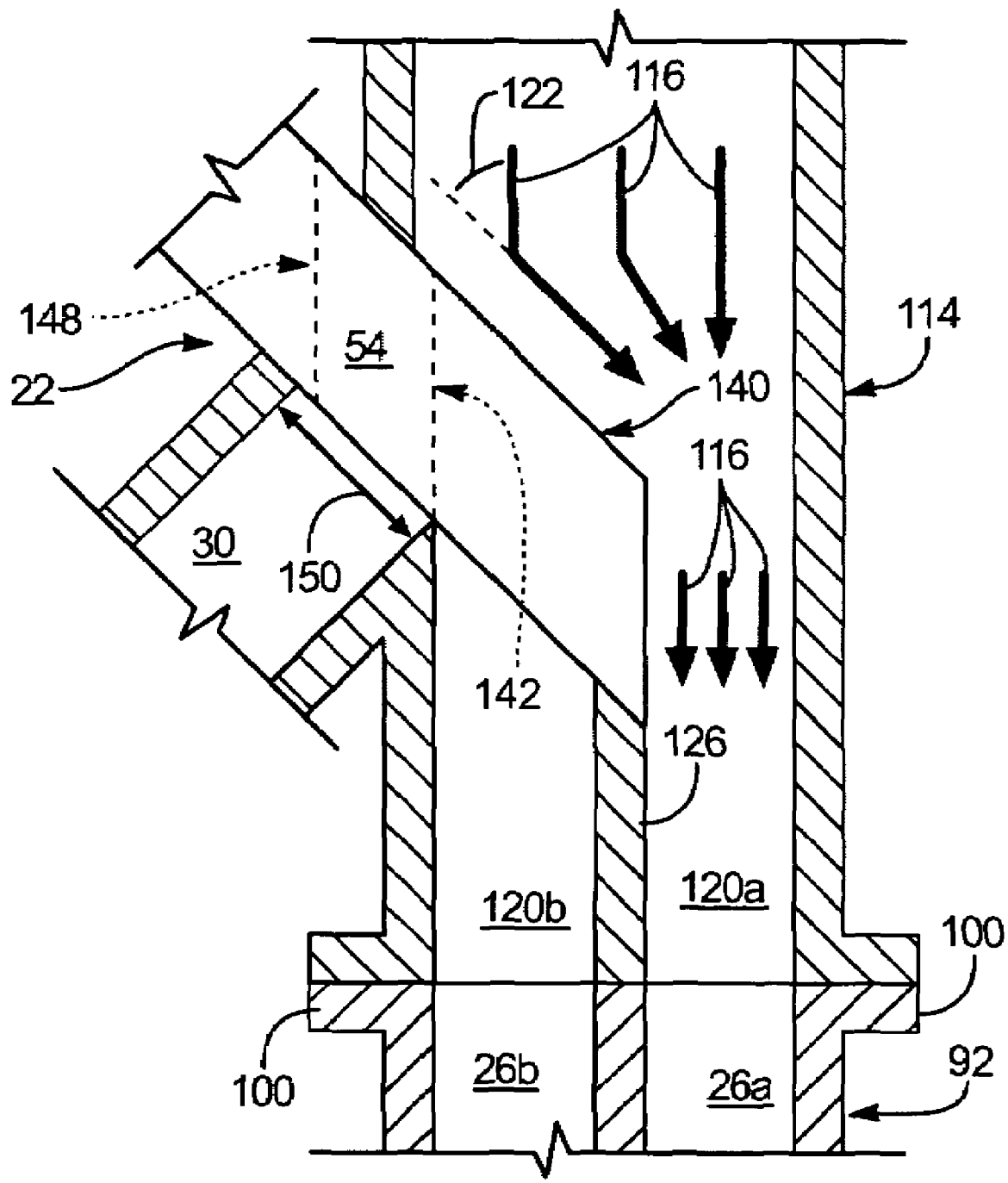
FIG. 27 is a top, cross-sectional view of one embodiment of a translating director in accordance with the present invention.

Referring to FIG. 27, in selected embodiments, a director 22 may include a gate 54 translating 150 though a range of positions 140, 142, 148 to control the flow 116 of exhaust gases. For example, when a gate 54 is extended to a first position 140, the flow 116 may be directed to a first downstream conduit 120*a*. When retracted to a second position 142, the flow 116 may enter both the first downstream conduit 120*a* and a second downstream conduit 120*b*. When retracted to a third position 148, the flow 116 may enter both the first and second downstream conduits 120*a*, 120*b*, as well as a bypass 30. The gate 54 may transition between the various positions 140, 142, 148 rapidly in steps or gradually in a continuous motion.

Figure 28:
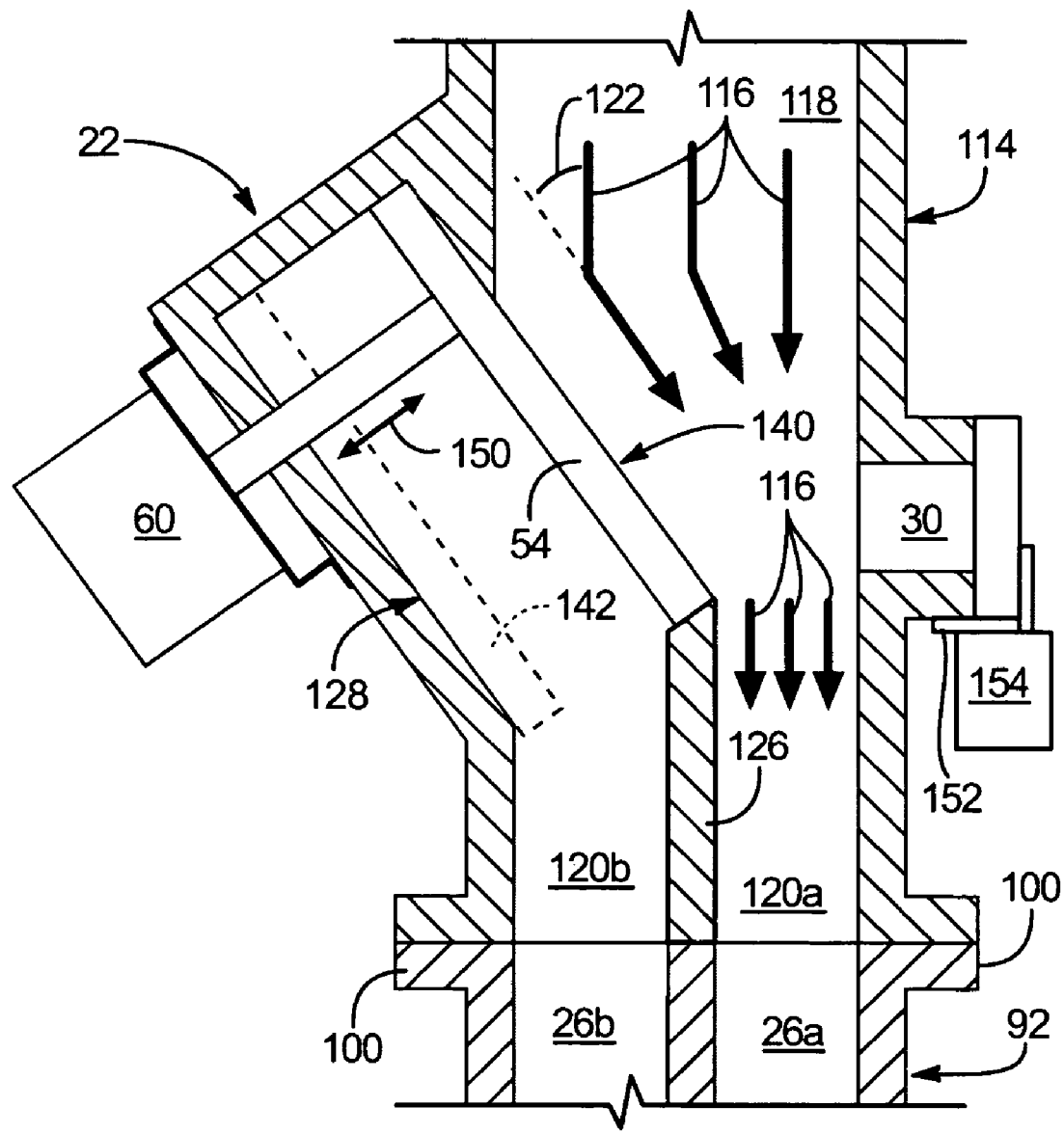
FIG. 28 is a top, cross-sectional view of an alternative embodiment of a translating director and independent bypass in accordance with the present invention.

Referring to FIG. 28, a gate 54 in accordance with the present invention may translate 150 in a wide variety of directions to exert control over the flow 116 of exhaust gases. While the gate 54 illustrated in FIG. 28 translates 150 in a direction substantially orthogonal to the gate 54 in FIG. 28, the two embodiments, may otherwise operate in a similar manner. Gates 54 translating 150 in directions other that those illustrated in FIGS. 27 and 28 may also be suitable.

In certain embodiments, it may be desirable to position the actuator 60 controlling the movement of the gate 54 outside the exhaust conduit 114. By placing the actuator 60 in a less hostile environment, the range of suitable actuators 60 may be increased. In certain embodiments, an actuator 60 may be positioned on a standoff 152 to further isolate the actuator 60 from the heat of the exhaust conduit 114.

In selected embodiments, a bypass 30 may be separated from the director 22. By separating the two devices 30, 22, the bypass 30 may be positioned in any suitable location without regard to the positioning of the director 20. In such an arrangement, the bypass 30 may be manipulated by an independent actuator 154. If desired, this independent actuator 154 may operate under the direction of the same controller 52 as the gate 54.

From the above discussion, it will be appreciated that the present invention provides a method and apparatus for increasing the power output by an internal combustion engine. The invention may include a turbine comprising a turbine wheel surrounded by at least two scrolls. The scrolls may direct exhaust gases supplied thereto toward the turbine wheel to cause rotation thereof. A director may be positioned upstream from the turbine to proportion the exhaust gases among the two scrolls in accordance with the volumetric flow of exhaust gases. A compressor may be driven by the turbine to deliver air at greater than ambient pressure to the intake conduit of the engine.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A turbocharger using the energy contained in an exhaust flow to compress an intake flow, the turbocharger comprising:

a turbine comprising a turbine wheel surrounded by at least two scrolls, the at least two scrolls each shaped to direct and deliver the exhaust flow supplied thereto directly against the turbine wheel to cause rotation thereof;

a channel to conduct the exhaust flow;

a director selectively moving through a range of motion bounded by a first position, wherein the director forms a wall of the channel to gradually converge the exhaust flow substantially exclusively into one of the at least two scrolls, and a second position, wherein the director is withdrawn substantially completely from within the exhaust flow, the range of motion including an intermediate position located between the first and second positions;

a bypass providing a conduit bypassing the turbine;

the director in the first position, in the intermediate position, and in all positions therebetween covering the bypass and resisting entrance of the exhaust flow into the bypass;

the director in the intermediate position being out of the channel, leaving the channel unobstructed to conduct the exhaust flow substantially exclusively into the at least two scrolls;

the director in the second position exposing the bypass and permitting entrance of exhaust flow into the bypass; and a compressor driven by the turbine.

2. The turbocharger of claim 1, wherein the turbine includes only a single turbine wheel.

3. The turbocharger of claim 2, wherein the director comprises a gate maintaining, in the first position, a monotonically reducing cross-section in the flow up to entry thereof into the one of the at least two scrolls.

4. The turbocharger of chain 3, wherein the range of motion comprises a third position where the director aims the exhaust flow into at least two of the at least two scrolls.

5. The turbocharger of claim 4, wherein the director further comprises a controller to control the position of the gate.

6. The turbocharger of claim 5, wherein the controller pivots the gate in accordance with pressure of the exhaust flow.

7. The turbocharger of claim 6, wherein the controller positions the gate to gradually converge exhaust flow exclusively into one of the at least two scrolls when the pressure of the exhaust flow is less than a first value.

8. The turbocharger of claim 7, wherein the controller positions the gate to aim exhaust flow into more than one of the at least two scrolls when the pressure of the exhaust flow is above the first value.

9. The turbocharger of claim 8, wherein the controller positions the gate to expose the bypass when the pressure of the exhaust flow is above a second value, greater than the first value.

10. The turbocharger of claim 9, wherein the turbine comprises a turbine wheel encircled by only two scrolls.

11. The turbocharger of claim 10, wherein the two scrolls are symmetric.

12. The turbocharger of claim 10, wherein the two scrolls are asymmetric.

13. The turbocharger of claim 1, wherein the director gradually converges exhaust flow substantially exclusively into the one of the at least two scrolls when the pressure of the exhaust flow is below a first value.

14. The turbocharger of claim 13, wherein the director aims exhaust flow into more than one of the at least two scrolls when the pressure of the exhaust flow is above the first value.

15. The turbocharger of claim 1, wherein the director comprises a pivoting gate formed as a single rigid structure.

16. The turbocharger of claim 1, wherein the director exposes a bypass when the pressure of the exhaust flow is above a threshold value.

17. The turbocharger of claim 1, wherein the director is selected from the group consisting of a poppet valve, translating valve, and pivoting valve.

18. The turbocharger of claim 1, wherein the director comprises a pivoting gate and a controller controlling the position of the pivoting gate.

19. The turbocharger of claim 18, wherein the controller operates using a mechanism selected from the group consisting of hydraulic, pneumatic, mechanical, and electrical actuators, and operates based on a sensed pressure selected from the group consisting of intake manifold pressure, exhaust manifold pressure, and rotational speed of an engine.

20. A turbocharger comprising:
a turbine comprising a turbine wheel surrounded by two scrolls, the two scrolls each directing and delivering exhaust gases supplied thereto directly against the turbine wheel to cause rotation thereof;
a channel to conduct the exhaust gases;
a director forming a wall of the channel to gradually converge the exhaust gases into substantially exclusively the first scroll when the pressure of the exhaust gases is below a first value and withdrawing substantially completely from within the exhaust gases when the pressure of the exhaust gases is above a second value, greater than the first value;
a bypass providing a conduit bypassing the turbine;
the director covering the bypass and resisting enhance of the exhaust gases into the bypass whenever the pressure of the exhaust gases is below an intermediate value between the first and second values;
the director, when the pressure of the exhaust gases is at the intermediate value, covering the bypass and being out of the channel, leaving the channel unobstructed to conduct the exhaust gases substantially exclusively into the two scrolls;
the director exposing the bypass and permitting entrance of exhaust gases into the bypass when the pressure of the exhaust gases is above the second valve; and
a compressor driven by the turbine.

21. The turbocharger of claim 20, wherein the director aims the exhaust gases into both of the two scroll when the pressure of exhaust gases is between the first and second values.

22. The turbocharger of claim 20, wherein the bypass relieves gases entrapped behind the director.

23. A system comprising:
an internal combustion engine having an intake conduit and an exhaust conduit, the internal combustion engine receiving air through the intake conduit and discharging exhaust gases through the exhaust conduit;
a turbine comprising a turbine wheel surrounded by at least two scrolls, the at least two scrolls each directing and delivering exhaust gases supplied thereto by the exhaust conduit directly against the turbine wheel to cause rotation thereof;
a director selectively moving through a range of motion bounded by a first position, wherein the director forms a wall of the exhaust conduit to gradually converge the exhaust gases substantially exclusively into one of the at least two scrolls, and a second position, wherein the director is withdrawn substantially completely from within the exhaust gases, the range of motion including an intermediate position located between the first and second positions;
a bypass providing a conduit bypassing the turbine;
the director in the first position, in the intermediate position, and in all positions therebetween covering the bypass and resisting entrance of the exhaust gases into the bypass;
the director in the intermediate position being out of the exhaust conduit, leaving the exhaust conduit unobstructed to conduct the exhaust flow substantially exclusively into the at least two scrolls;
the director in the second position exposing the bypass and permitting entrance of exhaust gases into the bypass; and
a compressor driven by the turbine to deliver air at greater than ambient pressure to the intake conduit.

24. The system of claim 23, wherein the turbine comprises a turbine wheel surrounded by two scrolls.

25. The system of claim 24, wherein the two scrolls are symmetric.

26. The system of claim 25, wherein the two scrolls are asymmetric.

27. A system comprising:
an internal combustion engine having an intake conduit and an exhaust conduit, the internal combustion engine receiving air through the intake conduit and discharging exhaust gases through the exhaust conduit;
a turbine comprising a turbine wheel surrounded by two scrolls, the two scrolls each directing exhaust gases supplied thereto by the exhaust conduit directly against the turbine wheel to cause rotation thereof, the two scrolls being asymmetric;
a director selectively moving through a range of motion bounded by a first position, wherein the director forms a wall of the exhaust conduit to gradually converge the exhaust gases into substantially exclusively one of the at least two scrolls, and a second position wherein the director is withdrawn substantially completely from within the exhaust gases, the range of motion including an intermediate position located between the first and second position;
a bypass providing a conduit bypassing the turbine;
the director in the first position, in the intermediate position, and in all positions therebetween covering the bypass and resisting entrance of the exhaust gases into the bypass;
the director in the intermediate position being out of the exhaust conduit, leaving the exhaust conduit unobstructed to conduct the exhaust gases substantially exclusively into the two scrolls;

the director in the second position exposing the bypass and permitting entrance of exhaust gases into the bypass;

the bypass relieving gases entrapped behind the director, and a compressor driven by the turbine to deliver air at greater than ambient pressure to the intake conduit.

28. A system comprising:

an internal combustion engine having an intake conduit and an exhaust conduit, the internal combustion engine receiving air through the intake conduit and discharging exhaust gases through the exhaust conduit;

a turbine comprising a single turbine wheel surrounded by a first scroll and a second scroll, each of the first and second scrolls directing exhaust gases supplied thereto by the exhaust conduit directly against the single turbine wheel to cause rotation thereof;

a director comprising a gate manipulated by a controller, the controller positioning the gate to form a wall of the exhaust conduit to gradually converge the exhaust gases substantially exclusively into the first scroll when a pressure of the exhaust gases is below a first value, and withdrawing the gate substantially completely from within the exhaust gases when the pressure is above a second value, greater than the first value;

a bypass providing a conduit bypassing the turbine;

the director covering the bypass and resisting entrance of the exhaust gases into the bypass whenever the pressure is below an intermediate value between the first and second values;

the director, when the pressure of the exhaust gases is at the intermediate value, covering the bypass and being out of the exhaust conduit, leaving the exhaust conduit unobstructed to conduct the exhaust gases substantially exclusively into the first and second scrolls;

the director exposing the bypass and permitting entrance of exhaust gases into the bypass when the pressure is above the second value;

the bypass relieving gases entrapped behind the director; and a compressor driven by the turbine to deliver air at greater than ambient pressure to the intake conduit.

* * * * *